(12) United States Patent
Schrader

(10) Patent No.: US 11,873,907 B2
(45) Date of Patent: Jan. 16, 2024

(54) METHODS AND DRIVE CIRCUIT FOR CONTROLLING A SOLENOID VALVE

(71) Applicant: Capstan Ag Systems, Inc., Topeka, KS (US)

(72) Inventor: Kale Schrader, Hiawatha, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 737 days.

(21) Appl. No.: 16/949,582

(22) Filed: Nov. 4, 2020

(65) Prior Publication Data

US 2021/0048117 A1   Feb. 18, 2021

Related U.S. Application Data

(62) Division of application No. 16/054,448, filed on Aug. 3, 2018, now Pat. No. 10,837,574.

(Continued)

(51) Int. Cl.
*F16K 31/06* (2006.01)
*H01F 7/18* (2006.01)
(Continued)

(52) U.S. Cl.
CPC ........ *F16K 31/0672* (2013.01); *B05B 1/3053* (2013.01); *F16K 15/044* (2013.01);
(Continued)

(58) Field of Classification Search
CPC .............. F16K 31/0672; F16K 15/044; F16K 31/0651; F16K 31/0675; B05B 1/3053;
(Continued)

(56) References Cited

U.S. PATENT DOCUMENTS 4,227,231 A ‡ 10/1980 Hansen .................. H01H 47/32
361/154
4,590,576 A   5/1986 Elpiner
(Continued)

FOREIGN PATENT DOCUMENTS

CN     105569859 A  ‡  5/2016
CN     105569859 A     5/2016
(Continued)

OTHER PUBLICATIONS

International Search Report and Written Opinion in related International Application PCT/US2018/045160, dated Nov. 21, 2018, 13 pages.‡

(Continued)

*Primary Examiner* — Dharti H Patel
(74) *Attorney, Agent, or Firm* — Armstrong Teasdale LLP

(57) ABSTRACT

A method of controlling a solenoid valve having a solenoid coil and a poppet includes energizing a first node to a first voltage, and coupling the first node to the solenoid coil and energizing the solenoid coil using a pulse-width-modulated (PWM) signal having a frequency and a duty cycle configured to regulate a current conducted through the solenoid coil to below an opening threshold. The method further includes energizing a second node to a second voltage with energy stored in the solenoid coil, and coupling the second node to the solenoid coil and energizing the solenoid coil using a DC signal configured to increase the current to above the opening threshold. The method further includes coupling the first node to the solenoid coil and energizing the solenoid coil using the PWM signal having a frequency and duty cycle configured to regulate the current to above a closing threshold.

20 Claims, 11 Drawing Sheets

Related U.S. Application Data

(60) Provisional application No. 62/540,630, filed on Aug. 3, 2017.

(51) Int. Cl.
*B05B 1/30* (2006.01)
*F16K 15/04* (2006.01)
*B05B 1/20* (2006.01)
*B05B 9/04* (2006.01)
*B05B 12/06* (2006.01)
*B05B 12/08* (2006.01)

(52) U.S. Cl.
CPC ...... *F16K 31/0651* (2013.01); *F16K 31/0675* (2013.01); *H01F 7/18* (2013.01); *H01F 7/1805* (2013.01); *H01F 7/1816* (2013.01); *H01F 7/1844* (2013.01); *B05B 1/20* (2013.01); *B05B 9/0413* (2013.01); *B05B 12/06* (2013.01); *B05B 12/087* (2013.01); *H01F 2007/1822* (2013.01); *H01F 2007/1866* (2013.01); *H01F 2007/1888* (2013.01)

(58) Field of Classification Search
CPC ......... B05B 1/20; B05B 9/0413; B05B 12/06; B05B 12/087; H01F 7/18; H01F 7/1805; H01F 7/1816; H01F 7/1844; H01F 2007/1822; H01F 2007/1866; H01F 2007/1888
USPC ....................................................... 361/160
See application file for complete search history.

(56) References Cited

U.S. PATENT DOCUMENTS

| | | | |
|---|---|---|---|
| 4,661,766 A ‡ | 4/1987 | Hoffman | H01H 47/325 318/139 |
| 4,729,056 A ‡ | 3/1988 | Edwards | F02D 41/20 361/153 |
| 4,967,309 A ‡ | 10/1990 | Hoffman | H01H 47/325 318/432 |
| 5,052,174 A ‡ | 10/1991 | Bak | F16K 31/0655 60/39 |
| 5,134,961 A ‡ | 8/1992 | Giles | A01M 7/0089 118/30 |
| 5,324,359 A ‡ | 6/1994 | Cleveland | B05C 5/0225 118/32 |
| 5,499,157 A ‡ | 3/1996 | Younessi | F02D 41/36 361/19 |
| 5,574,617 A | 11/1996 | Shimanuki | |
| 5,647,387 A | 7/1997 | Tsutsui | |
| 5,653,389 A ‡ | 8/1997 | Henderson | A01M 7/0089 239/17 |
| 5,704,546 A ‡ | 1/1998 | Henderson | A01M 7/0089 239/1 |
| 5,881,919 A ‡ | 3/1999 | Womac | B05B 7/0425 222/13 |
| 5,908,161 A ‡ | 6/1999 | Womac | B05B 1/3046 239/53 |
| 5,967,066 A ‡ | 10/1999 | Giles | A01C 23/024 111/11 |
| 6,019,347 A ‡ | 2/2000 | Adams | F16K 31/0655 251/12 |
| 6,050,281 A | 4/2000 | Adams | |
| 6,123,092 A | 9/2000 | Torii | |
| 6,302,080 B1 ‡ | 10/2001 | Kato | F02M 47/027 123/29 |
| 6,324,046 B1 ‡ | 11/2001 | Kadah | F23N 5/203 361/166 |
| 6,374,624 B1 ‡ | 4/2002 | Cholkeri | F16K 31/0651 251/12 |
| 6,493,204 B1 * | 12/2002 | Glidden | B60T 8/366 361/187 |
| 7,311,004 B2 ‡ | 12/2007 | Giles | A01C 23/047 73/592 |
| 7,502,665 B2 ‡ | 3/2009 | Giles | A01B 79/005 700/24 |
| 7,742,842 B2 ‡ | 6/2010 | Giles | B05B 12/004 700/28 |
| 7,826,930 B2 ‡ | 11/2010 | Giles | B05B 12/082 700/28 |
| 7,881,035 B2 | 2/2011 | Takahashi | |
| 8,059,382 B2 | 11/2011 | Schmidt | |
| 8,191,795 B2 ‡ | 6/2012 | Grimm | A01M 7/0089 239/1 |
| 8,830,649 B2 | 9/2014 | Oppermann | |
| 9,435,458 B2 ‡ | 9/2016 | Needham | F16K 31/0606 |
| 9,528,625 B2 | 12/2016 | Schweikert | |
| 9,635,848 B2 * | 5/2017 | Needham | A01M 7/0089 |
| 10,441,965 B2 ‡ | 10/2019 | Feldhaus | B05B 12/126 |
| 10,522,313 B2 | 12/2019 | Mecklenburg | |
| 10,773,271 B2 | 9/2020 | Funseth | |
| 10,773,721 B2 | 9/2020 | Buss | |
| 2003/0165038 A1 | 9/2003 | Ahrendt | |
| 2004/0057183 A1 | 3/2004 | Vincent | |
| 2004/0196092 A1 | 10/2004 | Tojo | |
| 2005/0279299 A1 | 12/2005 | Degner | |
| 2005/0279780 A1 ‡ | 12/2005 | Evans | B05B 12/00 222/504 |
| 2006/0102234 A1 ‡ | 5/2006 | Meisel | F16K 31/0655 137/53 |
| 2006/0151544 A1 ‡ | 7/2006 | Greenwald | B67D 1/1247 222/33 |
| 2006/0225489 A1 ‡ | 10/2006 | Giles | G01N 29/14 73/64 |
| 2006/0265106 A1 ‡ | 11/2006 | Giles | A01C 23/007 700/28 |
| 2006/0273189 A1 ‡ | 12/2006 | Grimm | B05B 9/0423 239/14 |
| 2007/0188967 A1 ‡ | 8/2007 | Smith | H01F 7/1816 361/15 |
| 2008/0230624 A1 ‡ | 9/2008 | Giles | F16K 31/0655 239/69 |
| 2008/0319584 A1 | 12/2008 | Fischer | |
| 2009/0108849 A1 | 4/2009 | Berg | |
| 2009/0213519 A1 ‡ | 8/2009 | Bedingfield | H01F 7/1805 361/140 |
| 2009/0309054 A1 ‡ | 12/2009 | Haller | F16K 31/0675 251/129.15 |
| 2009/0323246 A1 | 12/2009 | Brenner | |
| 2010/0032492 A1 ‡ | 2/2010 | Grimm | A01M 7/0089 239/1 |
| 2010/0259861 A1 ‡ | 10/2010 | Wendt | H01H 47/32 361/160 |
| 2012/0228395 A1 ‡ | 9/2012 | Needham | B05B 12/008 239/11 |
| 2013/0027833 A1 ‡ | 1/2013 | Rabe | H01F 7/1646 361/206 |
| 2014/0299673 A1 ‡ | 10/2014 | Grimm | F16K 31/0655 239/11 |
| 2015/0246369 A1 | 9/2015 | Sykes | |
| 2015/0300522 A1 ‡ | 10/2015 | Ito | H01F 7/1844 361/170 |
| 2015/0367357 A1 ‡ | 12/2015 | Humpal | B05B 12/12 239/1 |
| 2015/0367358 A1 ‡ | 12/2015 | Funseth | B05B 1/20 239/15 |
| 2015/0375247 A1 | 12/2015 | Funseth | |
| 2016/0203931 A1 ‡ | 7/2016 | Ramsey | H01H 47/04 361/194 |
| 2016/0265811 A1 ‡ | 9/2016 | Furmanek | F24H 9/2035 |
| 2017/0012063 A1 | 1/2017 | Kwak | |
| 2017/0120263 A1 ‡ | 5/2017 | Needham | F16K 31/0651 |
| 2017/0122268 A1 ‡ | 5/2017 | Hashimoto | F02M 26/53 |
| 2017/0284556 A1 ‡ | 10/2017 | Omekanda | H01F 7/081 |
| 2019/0040972 A1 * | 2/2019 | Schrader | H01F 7/18 |

(56) References Cited

U.S. PATENT DOCUMENTS

2020/0096019 A1* 3/2020 Schrader ................. F15B 1/033
2021/0048117 A1* 2/2021 Schrader ............. F16K 31/0651

FOREIGN PATENT DOCUMENTS

| | | | |
|---|---|---|---|
| DE | 10359272 A1 | 7/2004 | |
| DE | 102009006179 A1 | 7/2010 | |
| EP | 1260694 A2 | 11/2002 | |
| EP | 1346637 A1 ‡ | 9/2003 | ............ B05B 12/04 |
| EP | 1346637 A1 | 9/2003 | |
| EP | 2165770 A1 ‡ | 3/2010 | ............ F04B 53/10 |
| EP | 2165770 A1 | 3/2010 | |
| WO | WO-0110692 A1 * | 2/2001 | ............ B60T 8/327 |
| WO | 2008048550 A2 | 4/2008 | |

OTHER PUBLICATIONS

Written Opinion of the International Preliminary Examining Authority issued in connection with International Application No. PCTIUS2018/045160, dated Jun. 28, 2019, 5 pages.‡

Written Opinion of the International Preliminary Examining Authority in connection with International Application No. PCT/US2018/045160, dated Jun. 28, 2019, 5 pages.‡

International Preliminary Report on Patentability issued from the International Preliminary Examining Authority in connection with International Application No. PCT/US2018/045160, dated Oct. 15, 2019, 7 pages.‡

International Search Report and Written Opinion for International Application No. PCT/US2021/035706, dated Oct. 6, 2021, 30 pages.

International Preliminary Report on Patentability issued in International Patent Application No. PCT/US2021/035706, dated Aug. 22, 2022, 11 pages.

Second Written Opinion of the International Preliminary Examining Authority issued in International Patent Application No. PCT/US2021/035706, dated Apr. 28, 2022, 9 pages.

Extended European Search Report issued in European Patent Application No. 22189566.7, dated Jan. 12, 2022, 6 pages.

Written Opinion of the International Preliminary Examining Authority issued in connection with International Application No. PCT/US2018/045160, dated Jun. 28, 2019, 5 pages.

\* cited by examiner
‡ imported from a related application

METHODS AND DRIVE CIRCUIT FOR CONTROLLING A SOLENOID VALVE

CROSS-REFERENCE TO RELATED APPLICATIONS

This application is a divisional application of U.S. patent application Ser. No. 16/054,448, filed Aug. 3, 2018, which claims priority to U.S. Provisional Patent Application Ser. No. 62/540,630, filed on Aug. 3, 2017, the disclosure of which is hereby incorporated by reference in its entirety.

BACKGROUND

The present disclosure relates generally to fluid distribution systems and, more particularly, to control systems for operating fluid dispensing valves and methods of use.

In agricultural spraying, precise control of fluid flow through a valve is an important factor in delivering a specified amount of agrochemical to a specified area. Most agrochemicals such as crop protection agents and many fertilizers are applied as liquid solutions, suspensions, and emulsions that are sprayed onto the target fields. Certain agrochemicals, such as anhydrous ammonia, are dispensed into soil through dispensing tubes positioned behind knives or plows that prepare the soil for application.

Typically, the agrochemical liquid is supplied by powered pumps to simple or complex orifice nozzles that atomize the liquid stream into spray droplets. Nozzles are often selected primarily on the desired range of flow rates needed for the job and secondarily on the range of liquid droplet size spectra and spray distribution patterns they produce.

Increasing concerns over inefficient agrochemical use, the cost of agrochemicals and inadvertent spray drift or pesticide run-off have resulted in attempts to improve the quality, precision, accuracy and reliability of application of agrochemicals. This has led to increased use of electronic control systems and individual control of spray nozzles or nozzle assemblies through use of solenoid valves. Consequently, the power necessary to operate the solenoid valves increases as the number of valves and size of the system increase. Moreover, as fluid flow per valve increases, the necessary power increases further. At some point, the total power approaches limits of the electrical system, its components, and its conductors, e.g., wiring.

Solenoid valves generally include a solenoid coil, or winding, within which a poppet translates to open and close an orifice. Typically, the poppet is biased by a spring to the closed position. In operation, a current is supplied to the coil to generate a magnetic field that induces a force on the poppet. The force on the poppet generally results in the solenoid valve's opening or holding a position, against forces supplied by the spring and the pressure of fluid dispensed through the valve. Closing of the valve is generally achieved by the spring forces overcoming the force generated by the solenoid coil. Solenoid valves in sprayer systems are typically operated to deliver an on/off pattern or a pulse width modulation (PWM) pattern of fluid through a given valve and nozzle assembly. Under ideal conditions, a PWM fluid delivery pattern would match a PWM control signal in pulse width and duty cycle, implying an instantaneous opening and closing of the valve. However, opening or closing of a solenoid valve is not instantaneous due to inertia, fluid drag, poppet friction, material properties, and inherent electrical characteristics of the solenoid coil. The most profound delay in agricultural spray systems is due to the time-varying current relationship for a given voltage applied to an inductive coil, such as the solenoid coil, i.e., $V/L = \delta i/\delta t$. In other words, time is required to increase current conducted through the solenoid coil, i.e., coil current, to a level sufficient to generate the force necessary to control movement of the poppet.

In practice, such electrical characteristics skew the operational pulse width and duty cycle with which the solenoid valve operates with respect to an electrical pulse width and duty cycle that controls the solenoid valve. Likewise, the skew applies to the application of fluid itself.

Another component of the time delay in opening the solenoid valves is the fluid pressure differential across the orifice. Generally, as the differential pressure increases, the force necessary to translate the poppet to the open position increases, thus, according to the electrical characteristics described above, increasing the time required to open the valve. Conversely, the differential pressure is mitigated in certain types of valves, such as, for example, pressure-compensated valves. The relationship between valve opening time and current is typically non-linear and similar to that of an inductive coil current over time. The relationship between fluid pressure and open time is increasingly non-linear as coil current approaches the asymptotic limit for the solenoid coil. Consequently, an upper limit exists, referred to as the maximum operating pressure differential (MOPD), at which the solenoid valve cannot be opened due to the maximum current for a given voltage applied to the inductive coil.

Thus, a need currently exists for a system and process for rapid, precise, and predictable opening and closing of solenoid valves. Such a system and process is well suited for use in the agricultural field. It should be understood, however, that similar needs also exist in other fields. For example, on irrigation systems, in industrial spray driers, and in spray humidification or cooling systems. Specifically, a system that provides rapid and precise opening and closing of solenoid valves may find wide applicability in any system, whether commercial, industrial or residential, that utilizes solenoid valves.

BRIEF DESCRIPTION

In one aspect, a drive circuit for controlling a solenoid valve having a solenoid coil and a poppet that translates therein is provided. The drive circuit includes a first node, a second node, a control circuit, and a flyback circuit. The first node is configured to be energized by a power source to a first voltage. The control circuit is coupled to the first and second nodes, and is configured to: (1) selectively couple the first and second nodes in series with the solenoid coil, and periodically energize the solenoid coil using a pulse-width-modulated (PWM) signal having a frequency and a duty cycle configured to regulate a current conducted through the solenoid coil. The flyback circuit is coupled to the solenoid coil and configured to energize the second node to a second voltage with energy stored in the solenoid coil.

In another aspect, a method of controlling a solenoid valve having a solenoid coil and a poppet configured to translate therein is provided. The method includes (1) energizing a first node to a first voltage using a power source, (2) coupling the first node to the solenoid coil and energizing the solenoid coil using a pulse-width-modulated (PWM) signal having a frequency and a duty cycle configured to regulate a current conducted through the solenoid coil to below an opening threshold to maintain the poppet in a closed position, (3) energizing a second node to a second voltage with energy stored in the solenoid coil using a flyback circuit coupled to the solenoid coil, (4) coupling the second node to the solenoid coil and energizing the solenoid coil using a DC signal configured to increase the current to above the opening threshold to translate the poppet toward an opened position, and (5) coupling the first node to the solenoid coil and energizing the solenoid coil using the PWM signal having a frequency and a duty cycle configured to regulate the current to above a closing threshold to maintain the poppet in the opened position.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

Corresponding reference characters indicate corresponding parts throughout the several views of the drawings.

DETAILED DESCRIPTION

Figure 1:
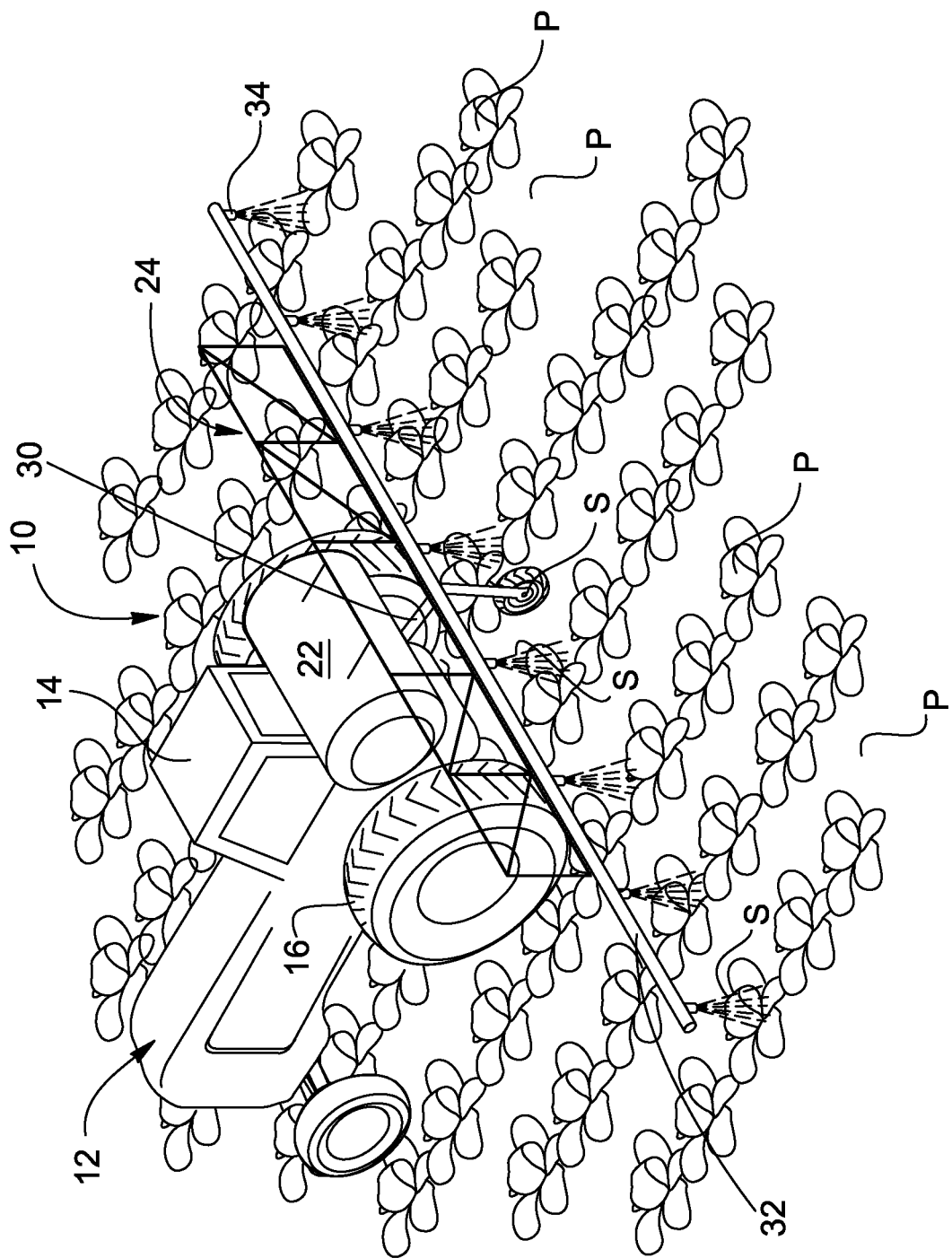
FIG. 1 is a perspective view of one embodiment of an agricultural spray system.

It is realized herein that by increasing the operating voltage of the solenoid valve, the time delays resulting from electrical characteristics and fluid pressure in opening the solenoid valve are reduced. For example, in agricultural spray systems, the operating voltage of solenoid valves may be increased from 12 Volt (V) direct current (DC) to 24 Volt DC or more. It is further realized herein that 24 Volt DC is typically unavailable on agricultural equipment. Moreover, increasing to 24 Volt DC would increase power dissipation by the solenoid coil, and would potentially exceed electrical ratings for the solenoid coil itself, wiring, or other electrical components on a given agricultural spray system.

It is realized herein the required force is at its peak when translating the poppet from the closed position to the open position, which is when the combined countervailing forces of the fluid pressure and a spring pre-loading of the poppet are at their peak. More specifically, spring forces on the poppet increase as the spring is compressed with translation toward the opened position, but fluid pressure across the valve drops significantly when the poppet translates from the closed position. Conversely, the required force for holding the poppet in an opened position is significantly reduced from that necessary to open the solenoid valve. Accordingly, it is realized herein, the operating voltage of the solenoid valve may be increased momentarily when opening the solenoid valve to reduce the turn-on time delay, thereby reducing the time necessary to reach a coil current sufficient to translate the poppet to the open position. Further, the coil current may be reduced when holding the poppet in the opened or closed state to conserve power.

It is realized herein, given that agricultural equipment typically lack, for example, a 24 Volt DC power source, an additional power source is needed for generating the increased potential across the solenoid valve. Such a power source, in certain circumstances, may be an additional battery or power supply. In many agricultural spray systems, it may be preferred to provide a converter circuit for generating, for example, the 24 Volt DC power from a 12 Volt DC source. However, the cost and added complexity, size, and weight of converter circuits, including, for example, a switching boost converter, may be prohibitive.

A typical switching boost converter includes an inductive coil that, when energized with a PWM current signal at a first voltage (e.g., a low voltage), stores an electromagnetic field that, when current amplitude is reduced, generates a flyback voltage across the inductive coil that is captured and used to energize a bus, or "node," to a second voltage that is either higher than the first voltage or that is a negative voltage. It is realized herein a switching boost converter circuit may be constructed utilizing a solenoid coil of a solenoid valve as the necessary inductive coil. Further, in certain embodiments, a drive circuit for controlling such a solenoid valve may include various other components, in addition to the inductive coil, necessary for constructing the switching boost converter. It is further realized herein the inductive coil of the switching boost converter is typically the most expensive, largest, and heaviest component in the device. As power requirements increase, the size and cost of the inductive coils tend to increase as well.

It is realized herein current supplied to the solenoid coil of a solenoid valve in a spray system can be regulated to both provide a PWM fluid pattern based on periodic opening and closing of the solenoid valve, and operate as a switching boost converter to energize a second node that is a high voltage bus or, in the alternative, a negative voltage bus, or "sub-ground." It is further realized herein the second node may be used to energize the solenoid coil during opening to improve the speed, precision, and predictability of valve opening, and also improving MOPD.

One exemplary agricultural spray system may operate valves at about 10 Hertz, i.e., a given solenoid valve is opened every 100 milliseconds (ms) according to a valve-pulsing PWM signal. The solenoid valve may take about 6 ms to open and about 4 ms to close. For the remainder of the 100 ms period, the solenoid valve maintains the poppet in the opened or closed position, otherwise referred to as idle time. Typically, when a solenoid valve is activated, i.e., opened and held open, the solenoid coil is energized continuously and, conversely, when the solenoid valve is deactivated, i.e., closed and held close, the solenoid coil is de-energized. It is realized herein the frequency and duty cycle of the current conducted through the solenoid coil may be regulated to continuously conduct current through the solenoid coil while maintaining the control of the desired valve-pulsing PWM signal.

The frequency and duty cycle may be regulated for four distinct durations: (1) holding the poppet in a closed position, (2) translating the poppet from the closed position to the opened position, (3) holding the poppet in the opened position, and (4) translating the poppet from the opened position to the closed position.

When holding the poppet in the closed position, a first voltage (e.g., a low voltage such as 12 VDC) is applied to the solenoid coil and the coil is energized using a PWM signal such that the current conducted through the solenoid coil is regulated to below the opening threshold, i.e., the threshold current for opening the solenoid valve. Rather than keeping the solenoid coil de-energized, as is typical, maintaining some current through the solenoid coil enables energy to be continuously stored in the solenoid coil. During the PWM period and during any of the above durations, when the solenoid coil is de-energized, energy stored in the solenoid coil is recovered by a flyback circuit that charges a second node, i.e., the solenoid coil and flyback circuit form a switched boost converter.

The PWM signal is regulated in frequency and duty cycle to both maintain current conducted through the solenoid coil below the opening threshold and to optimize performance of the flyback circuit for charging the second node. When the first voltage is applied to the solenoid coil, e.g., when holding the poppet in the closed position and charging the second node, the rate at which the second node is charged is directly related to the power stored in the solenoid coil, which is based on the current conducted through the solenoid coil and the inductance of the coil. This is also related to the voltage applied to the solenoid coil and the inductance of the solenoid coil, i.e., the first voltage and the inductance defined by the solenoid coil. The inductive current curve is generally non-linear near the asymptotic current limit, and becomes more linear as current moves toward zero. However, the rate at which the solenoid coil discharges through the flyback circuit and onto the second node increases as the charge on the second node increases. Accordingly, it is realized herein, frequency and duty cycle of the PWM signal may be adjusted continuously to maintain a target coil current as the second node charges. Generally, for a given frequency, as the duty cycle of the PWM signal increases, more of the cycle time is spent storing energy in the solenoid coil and less of the cycle time is spent discharging the solenoid coil through the flyback circuit to charge the second node. Conversely, decreasing the duty cycle allots more time for discharge and less time for charging. Further, increasing the frequency of the PWM signal shortens the period of the PWM cycle and, consequently, reduces the time available for both charging and discharging the solenoid coil. Generally, a higher frequency PWM signal yields lower peak-to-peak current levels through the solenoid coil, and a lower frequency PWM signal lengthens cycle times and allots more time for charging and discharging the solenoid coil.

Referring again to holding the poppet in the closed position, the PWM signal is regulated, for example, to a low frequency and a low duty cycle to hold the coil current just below the opening threshold, while maximizing discharge (of the solenoid coil) time to charge the second node through the flyback circuit. The duty cycle of the PWM signal may be, for example, in the range of 10% to 50%. The valve is operated, i.e., opened and closed, in a frequency range of about 3-40 Hertz. The low frequency PWM signal may have a frequency in a range of, for example, 100 Hertz to 5 kilohertz. The frequency and duty cycle for a given solenoid valve may vary from these ranges according to the size, i.e., inductance of the solenoid coil, as well as the various parameters that define the opening threshold. In certain embodiments, frequency of the PWM signal may be increased just before opening, e.g., about 5 ms before opening, to ramp up coil current leading up to opening the solenoid valve. In such embodiments, the frequency of the PWM signal may be increased to above 1000 Hertz. In certain embodiments, the frequency may be increased to a range of 4 kilohertz to 100 kilohertz depending on the size of the solenoid valve.

When the solenoid valve is to be opened, i.e., the poppet translates from the closed position to the opened position, a second voltage, sourced from the second node, is applied to the solenoid coil in addition to the first voltage from a first node, or power source, and the coil is energized using 100% duty cycle DC signal to increase the coil current above the opening threshold as quickly as possible. In certain embodiments, the second node is charged to a high voltage that is larger than the first voltage (e.g., 24 VDC versus 12 VDC on the first node). In alternative embodiments, the second node is charged to a large negative voltage (e.g., −24 VDC). The large potential resulting from the series-combined voltage sources (i.e., first and second nodes, or e.g., low voltage bus and high voltage bus) and high (i.e., 100%) duty cycle PWM signal combine to provide a fast opening time. Moreover, the coil current leading up to the opening is preferably maintained just below the opening threshold, thereby minimizing the time required to increase the current through the solenoid coil to above the opening threshold. Accordingly, the delay in opening the solenoid valve is reduced.

When the solenoid valve is opened, there is a duration when the poppet is maintained in the opened position. Generally, the power necessary to hold the poppet in an opened position is much less than the power necessary to translate the poppet to the opened position. It is realized herein that once the poppet is in the opened position, the potential on the second node may be removed from the solenoid coil, i.e., leaving the first voltage of the first node (e.g., lower voltage), and duty cycle may be reduced, i.e., a PWM signal, to reduce the power consumption of the solenoid valve. The coil current is regulated to just above a closing threshold, i.e., a current threshold below which the force generated by the solenoid coil is insufficient to hold the poppet in the opened position. Likewise, when the solenoid coil is de-energized during the PWM period, energy stored in the solenoid coil is recovered by the flyback circuit that charges the second node.

When holding the poppet in the opened position, coil current is regulated to above the closing threshold. Accordingly, the frequency and duty cycle of the PWM signal are regulated to hold the coil current just above the closing threshold and to optimize performance of the flyback circuit in charging the second node. Moreover, the frequency and duty cycle are regulated to reduce power consumption when the poppet is not being translated. Duty cycle is regulated to maintain coil current just above the closing threshold and to allot as much time as possible to discharge the solenoid coil through the flyback circuit to charge the second node. In certain embodiments, for example, duty cycle is regulated to a range of 40% to 90%. As described above, this range of duty-cycle may vary for a given solenoid valve. Frequency of the PWM signal, in certain embodiments, is held high, for example, in a range of 1000 to 2000 Hertz, to provide lower peak-to-peak coil current levels and, consequently, tighter control to hold coil current just above the closing threshold. In certain embodiments, the frequency may droop to lengthen the cycle and the duty cycle reduced to allot additional discharge time for the solenoid coil. In certain embodiments, frequency and duty cycle may only be increased a short duration, e.g., 5 milliseconds, before the solenoid valve is to be closed. In such embodiments, the frequency and duty cycle of the PWM signal may be optimized to charge the second node until the short duration before closing the solenoid valve. In certain embodiments, the current conducted through the solenoid coil is monitored and the measurement used to dynamically control the frequency and duty cycle of the PWM signal to charge the second node.

When the solenoid valve is to be closed, voltage is removed from the solenoid coil to reduce the coil current to below the closing threshold. In certain embodiments including a charge pump circuit, the charge pump circuit would also be allowed to float (i.e., as an open circuit), allowing the coil current to discharge rapidly (e.g., through a TVS diode), or configured to speed up dissipation of the solenoid coil (e.g., by re-referencing the charge pump circuit) while charging the charge pump capacitor. Once the poppet is in the closed position, it is realized herein, the solenoid coil should continue to conduct a current to maintain the energy stored in the solenoid coil and to remain ready for the next opening cycle. Accordingly, the current conducted through the solenoid coil is regulated to just below the opening threshold. In contrast, the solenoid coil is typically de-energized entirely.

In alternative embodiments, the advantages described above for the use of a second voltage (e.g., a higher voltage or a negative voltage) when opening the solenoid valve can be achieved using solenoid coils having similar magnetic characteristics and a lower internal resistance, and thus, a lower constant voltage rating due to power dissipation. Such a configuration enables faster turn-on times without providing a separate high voltage bus supplied by a separate power supply. The opening operation of the solenoid valve is generally unchanged, however, once opened, the voltage applied across the solenoid coil can be reduced, i.e., divided, by coupling multiple solenoid coils for multiple solenoid valves in series, i.e., daisy-chaining solenoid coils. Moreover, in other embodiments, coil current may be throttled as described herein to reduce overall power consumption.

In further alternative embodiments, the solenoid valve and solenoid coil may be designed to fit the drive circuit and the achievable voltage levels. Such optimization ensures power ratings of the solenoid coil are acceptable for the power levels applied to the solenoid valve.

Referring now to the Figures, FIG. 1 is a perspective view of one embodiment of a spray system, indicated generally at 10, operatively connected to a work vehicle 12. As shown, work vehicle 12 includes a cab 14 and a plurality of wheels 16. Work vehicle 12 may in certain embodiments be an agricultural tractor having any suitable configuration. However, it should be appreciated that in other embodiments, any other suitable aero or ground means may be provided for moving spray system 10. For example, in other embodiments, work vehicle 12 may not include a cab, and instead may have any suitable operator station. Further, in some embodiments, work vehicle 12 and/or spray system 10 may include a global positioning system (e.g., a GPS receiver) for automated control of work vehicle 12 and/or spray system 10. In some embodiments, the global positioning system is used to monitor a travel speed of vehicle 12 and/or spray system 10, and/or to monitor a position of work vehicle 12 and/or spray system 10.

In the example embodiment, spray system 10 includes at least one boom wheel 18 for engaging a section of ground with a crop, produce, product or the like (generally, P), a tank or reservoir 22, and a spray boom 24. Spray boom 24 includes a plurality of nozzle assemblies 34 attached thereto and in fluid communication with tank 22. Tank 22 holds a product S, such as a liquid, a mixture of liquid and powder, or other product. Product S may be a quantity of water or an agrochemical such as a fertilizer or a pesticide, and may be sprayed from nozzle assemblies 34 onto, for example, a crop or produce or ground P itself, as shown in FIG. 1 and described in greater detail below. It should be appreciated, however, that in other embodiments, system 10 may have any other suitable configuration. For example, in other embodiments, system 10 may not include boom wheel 18 or may alternatively include any suitable number of boom wheels 18. Further, while work vehicle 12 is depicted as towing spray system 10 in the example embodiment, it should be appreciated that, in other embodiments, work vehicle 12 may transport spray system 10 in any suitable manner that enables spray system 10 to function as described herein.

The quantity of product S held in tank 22 generally flows through a conduit to nozzle assemblies 34. More specifically, in the embodiment illustrated in FIG. 1, product S flows from tank 22, through a pipe 30 to a boom pipe 32, and from boom pipe 32 to nozzle assemblies 34. In certain embodiments, nozzle assemblies 34 comprise direct acting solenoid valve equipped nozzles (see, e.g., FIG. 2) and system 10 may include a pump, transducers to measure fluid pressure and fluid flow, sectional regulating valves, and a pressure and/or flow controller (not shown in FIG. 1). If included, the pump may be positioned downstream from tank 22, upstream from boom pipe 32 and nozzle assemblies 34, and in operative communication with a controller for controlling operation thereof. The pump may be a pulse width modulation controlled pump configured to provide a desired amount of product S flow through system 10. The spray system 10 may also include a pressure or flow controller configured to vary certain operating parameters of the pump, such as the pump's pulse frequency and/or duty cycle, to obtain a desired product flow rate through system 10.

Referring still to FIG. 1, product S flows through nozzle assemblies 34 and may be applied to ground P in various ways. For example, product S may flow from nozzle assemblies 34 in a pulsed pattern. It should be appreciated that terms "pipe" and "conduit," as used herein, may mean any type of conduit or tube made of any suitable material such as metal or plastic, and moreover that any other suitable ground application devices can be added to provide varying effects of placement of product S on top or below a soil surface of ground P, such as via pipes, knives, coulters, and the like.

Figure 2:
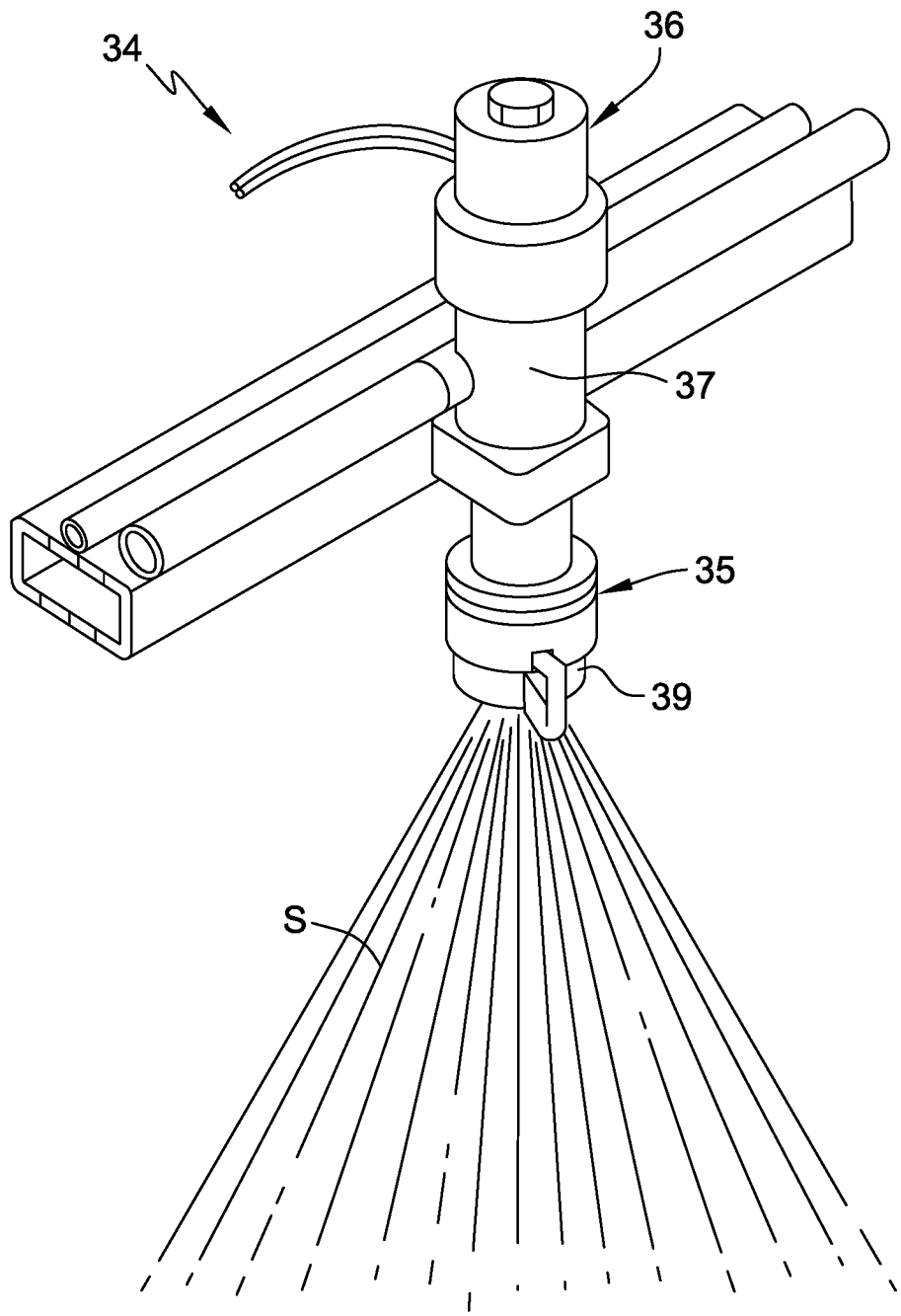
FIG. 2 is a perspective view of one embodiment of a nozzle assembly suitable for use with the agricultural spray system of FIG. 1.

FIG. 2 is a perspective view of one embodiment of a nozzle assembly 34 suitable for use with spray system 10 of FIG. 1. As shown in FIG. 2, nozzle assembly 34 generally includes a valve assembly 36, a nozzle body 37 configured to receive product S flowing through boom pipe 32 and a spray nozzle 39 mounted to and/or formed integrally with nozzle body 37 for expelling product S from nozzle assembly 34 onto crops, product and/or ground P.

Figure 3:
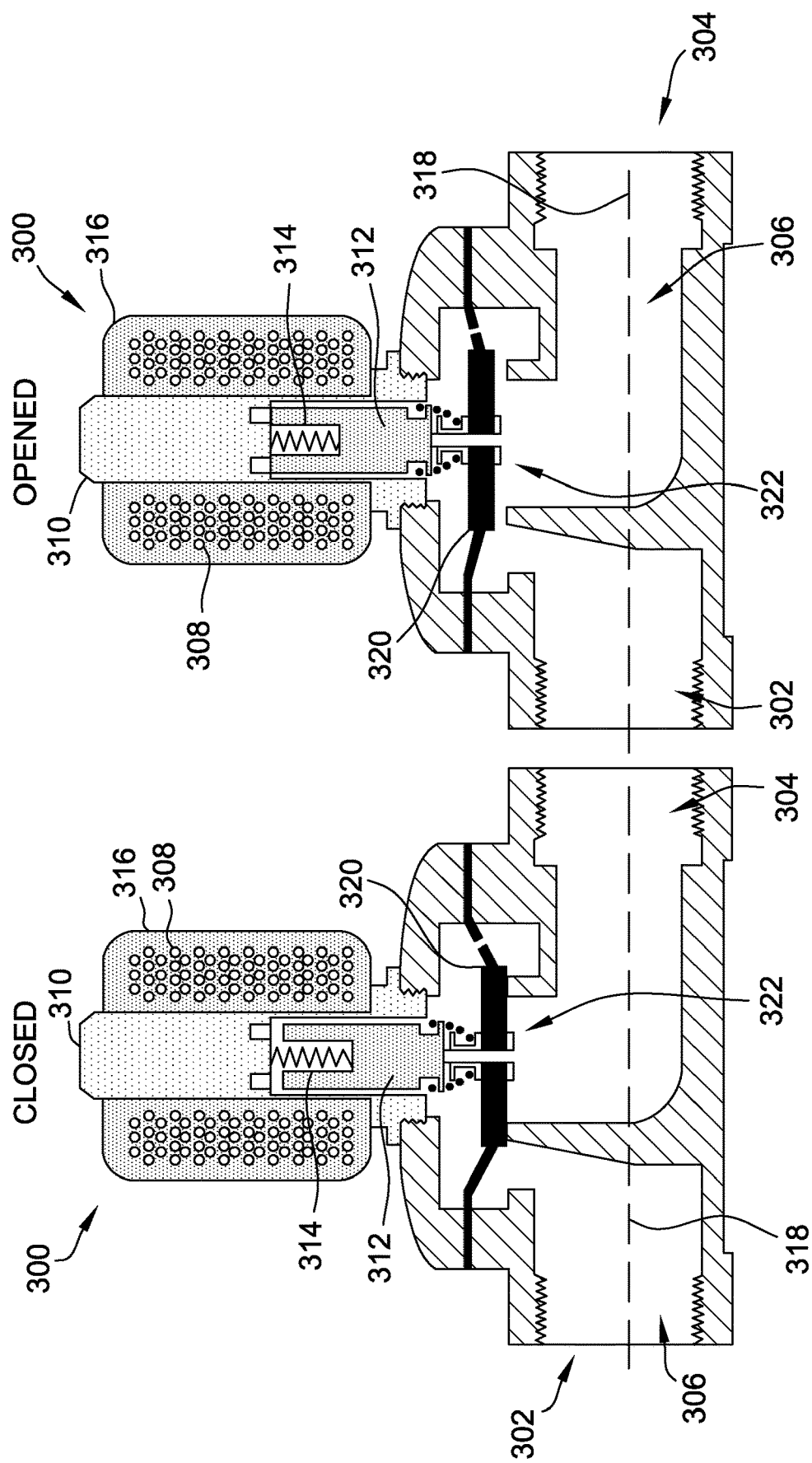
FIG. 3A and FIG. 3B are sectional views of a portion of a solenoid valve suitable for use in the nozzle assembly shown in FIG. 2.

In some embodiments, valve assembly 36 is a solenoid valve (see, e.g., FIG. 3). Moreover, in some embodiments, valve assembly 36 may be configured to be mounted to and/or integrated with a portion of spray nozzle 39. In some embodiments, for example, valve assembly 36 may be mounted to the exterior of nozzle body 37, such as by being secured to nozzle body 37 through the nozzle's check valve port. Alternatively, valve assembly 36 may be integrated within a portion of nozzle body 37.

FIGS. 3A and 3B are schematic cross-sectional views of one embodiment of an electric solenoid valve 300 suitable for use in nozzle assembly 34 shown in FIG. 2. FIG. 3A illustrates solenoid valve 300 in a closed position. FIG. 3B illustrates solenoid valve 300 in an open position. In general, valve 300 includes an inlet 302 and an outlet 304 for receiving and expelling fluid 306 from valve 300. Valve 300 also includes a solenoid coil 308 located on and/or around a guide 310. For instance, in one embodiment, solenoid coil 308 is wrapped around guide 310. Additionally, an actuator or poppet 312 is movably disposed within guide 310. In particular, poppet 312 may be configured to be linearly displaced within guide 310. Moreover, as shown, valve 300 includes a spring 314 coupled between guide 310 and poppet 312 for applying a force against poppet 312 to bias poppet 312 towards the closed position. Valve 300 may also include a valve body 316 or other outer covering disposed around coil 308.

As shown in the illustrated embodiment, valve 300 is configured as an in-line valve. Thus, fluid 306 may enter and exit valve 300 through inlet 302 and outlet 304, respectively, along a common axis 318. In other words, the inlet 302 and outlet 304 may generally be aligned along axis 318. In alternative embodiments, valve 300 may be in any other suitable configuration for a solenoid valve, such as, for example, a counter flow valve or a pressure-compensated valve.

In addition, solenoid coil 308 may be coupled to a controller (not shown) configured to regulate or control the current provided to coil 308. The controller may be enclosed within valve assembly 300, may be enclosed within nozzle assembly 34, as shown in FIG. 2, or may exist some distance away from nozzle assembly 34. The controller may generally comprise any suitable computer and/or other processing unit, including any suitable combination of computers, processing units and/or the like that may be communicatively coupled to one another (e.g., a controller may form all or part of a controller network). Thus, the controller may include one or more processor(s) and associated memory device(s) configured to perform a variety of computer-implemented functions (e.g., performing the methods, steps, calculations and/or the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller to perform various functions including, but not limited to, controlling the current supplied to solenoid coil 308, monitoring inlet and/or outlet pressures of the disclosed valve(s), monitoring poppet operation of the disclosed valves, receiving operator inputs, performing the calculations, algorithms and/or methods described herein and various other suitable computer-implemented functions.

Figure 4:
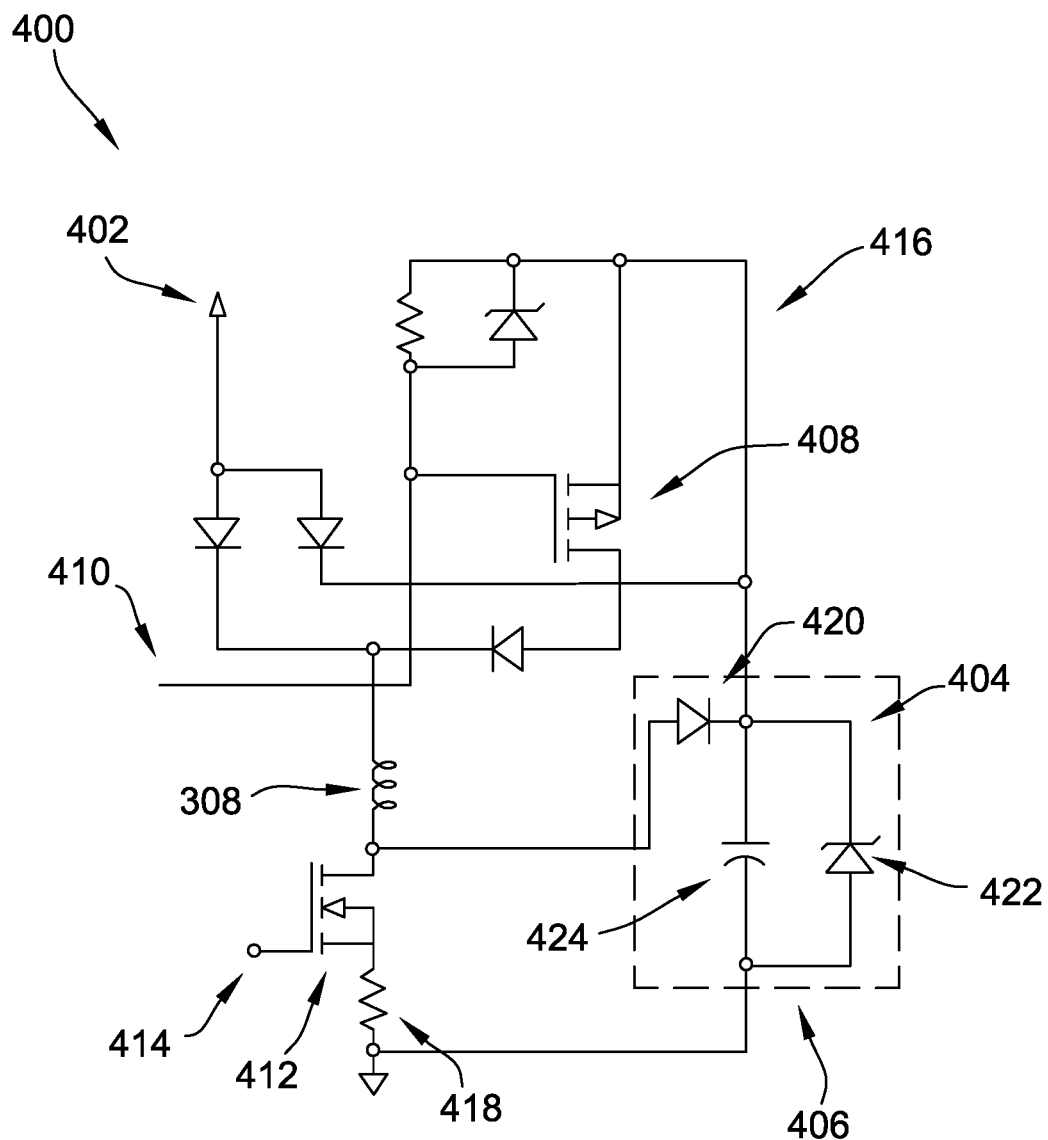
FIG. 4 is a schematic diagram of a drive circuit for use with the solenoid valve shown in FIG. 3.

Coil 308 may be configured to receive a controlled electric current or electric signal from the controller such that poppet 312 may move within guide 310. For example, in one embodiment, the controller includes a drive circuit as shown in FIG. 4, or any other suitable device that is configured to apply a regulated current to coil 308, thereby creating a magnetic field that biases (by attraction or repulsion) poppet 312 towards the opened or closed position. As a result, poppet 312 may be moved to a proper throttling position for controlling the pressure drop across valve 300. Additionally, the attraction between coil 308 and poppet 312 may also allow poppet 312 to be pulsated or continuously cyclically repositioned, thereby providing for control of the average flow rate through valve 300.

In several embodiments, a modulated square wave (e.g., PWM signal) drives valve 300 to control the opening and closing. A "pulse" corresponds to a duration (e.g., a 100 millisecond cycle) in which a low frequency duty cycle value (e.g., at a frequency of less than 40 Hz) sets the amount of on/off time. The "off" time may correspond to a "coil discharging period" in which the drive voltage is turned off continuously and a "modulated period" in which the voltage is turned on and off at a high frequency (e.g., at a frequency of greater than 100 Hz). The PWM signal is used to hold poppet 312 in the open or closed position. The frequency and duty cycle of the PWM signal are used to regulate coil current and at least partially open valve 300 by moving poppet 312 to the open position. The duration of the coil discharging (or charging) period may be determined by the amount of time for the coil current to reach the desired value. The coil current may be continuously measured and compared to a threshold in order to control power to coil 308.

Forces from spring 314, fluid 306 and coil 308 act on poppet 312 simultaneously. Specifically, the forces from spring 314 and fluid 306, tend to bias poppet 312 towards the closed position, while the force from coil 308 tends to bias poppet 312 towards the opened position.

Thus, when valve 300 is unpowered (i.e., when a voltage is not applied across coil 308), spring 314 and the pressure differential across the valve 300 may force poppet 312 towards the closed position such that the system pressure has a tendency to force valve 300 into a sealed or closed position. In such an embodiment, poppet 312 may include a rubber disk or any other suitable sealing member 320 configured to press against an orifice 322 of outlet 304 to create a leak-free seal on valve 300 when valve 300 is in the closed position. Additionally, when valve 300 is powered (i.e., when a voltage is applied to coil 308), poppet 312 may be attracted by coil 308 away from orifice 322 such that poppet 312 is moved to the open position. Specifically, the current supplied to coil 308 may be controlled such that the force acting on poppet 312 by coil 308 is sufficient to position poppet 312 a predetermined distance from orifice 322 of valve 300, thereby opening valve 300.

When valve 300 is being pulsed, the movement of poppet 312 may be cycled between the open position and a closed position, wherein poppet 312 is sealed against orifice 322. In such an embodiment, in order to transition valve 300 from the closed position to the open position, valve 300 is initially energized with a 100% duty cycle to move poppet 312 from the closed position to the open position as quickly as possible. Subsequently, the current supplied to coil 308 may be controlled such that poppet 312 may be cyclically pulsed between the closed position and the open position.

The sizes of inlet 302 and outlet 304, as well as the geometry and/or configuration of poppet 312 and guide 310, may be chosen such that the force acting on poppet 312 from coil 308 may overcome the fluid forces and spring forces for every throttling position within the total stroke of valve 300 when the coil is fully powered. Similarly, in one embodiment, spring 314 may be sized such that the spring force corresponds to the minimal amount of force required to maintain a drip-free valve 300 when valve 300 is unpowered. Additionally, in some embodiments, variable rate springs and/or partial springs may be selected to tune a particular valve design.

Generally, the solenoid valve 300 may be utilized to control the flow through any suitable device. However, in several embodiments of the present disclosure, the solenoid valve 300 may be used to control the flow through an agricultural spray nozzle. In such embodiments, the disclosed solenoid valve 300 may be configured as part of a nozzle assembly for use with various agricultural spraying systems.

Although systems and methods are described herein with reference to an agricultural spray system, embodiments of the present disclosure are suitable for use with agricultural fluid application systems other than spray systems. In some embodiments, for example, the systems and methods of the present disclosure are implemented in a fluid application system that injects fluid, such as fertilizer, into the soil through dispensing tubes, rather than spray nozzles.

FIG. 4 is a schematic diagram of a drive circuit 400 for use with the solenoid valve shown in FIG. 3. Drive circuit 400 includes a low voltage bus 402 (a first node) and a high voltage bus 404 (a second node). Low voltage bus 402 is configured to be energized by a power source, such as, for example, a 12 Volt DC power supply. High voltage bus 404 is configured to be energized by a flyback circuit 406 coupled to solenoid coil 308. In one embodiment, low voltage bus 402 is charged to 12 Volt DC and high voltage bus 404 is charged to 24 Volt DC. In alternative embodiments, voltages of low voltage bus 402 and high voltage bus 404 may vary over time. For example, low voltage bus 402 is ideally charged to 12 Volt DC, but varies over time from 11-14 Volt DC. Likewise, the voltage to which high voltage bus 404 is charged may vary over time and may exceed 24 Volt DC. For example, in one embodiment, high voltage bus 404 is charged up to 36 Volts DC.

Drive circuit 400 includes a switch 408 for selectively coupling high voltage bus 404 to solenoid coil 308. For example, switch 408 is illustrated as a PFET device controlled by a switching signal 410 to couple and decouple high voltage bus 404 to solenoid coil 308. Drive circuit 400 is configured to be coupled to a controller (not shown) that generates switching signal 410 according to a valve-pulsing PWM signal that initiates opening of the solenoid valve, such as solenoid valve 300 shown in FIG. 3.

Drive circuit 400 includes a switch 412 that periodically couples solenoid coil 308 to ground, thereby enabling solenoid coil 308 to conduct current. For example, switch 412 is illustrated as a NFET device controlled by a switching signal 414 generated by a controller (not shown). Switch 412 applies a PWM signal to solenoid coil 308 to energize solenoid coil 308 while holding poppet 312 in position, e.g., in the opened or closed positions. Switch 412 is operated at a frequency and duty cycle, thereby regulating the frequency and duty cycle of the PWM signal that energizes solenoid coil 308. Switch 412 is opened and closed when closing and opening valve 300, respectively. Switch 412 is closed to apply a 100% duty cycle DC voltage to solenoid coil 308 when opening valve 300. Likewise, switch 412 is opened to remove power from solenoid coil 308 when closing valve 300.

Switches 408 and 412 at least partially compose a control circuit 416. In certain embodiments, control circuit 416 includes a current sensor, such as current sense resistor 418 configured to measure the current conducted through solenoid coil 308. Control circuit 416 may then regulate the frequency and duty cycle of the current conducted through solenoid coil 308 by controlling switch 412 based on the coil current measured by current sense resistor 418. In alternative embodiments, control circuit 416 includes any other suitable device for measuring current through solenoid coil 308, such as, for example, a hall-effect sensor. In further alternative embodiments, control circuit 416 is configured to measure current through solenoid coil 308 when solenoid coil 308 is charging, and further configured to predict discharge time of solenoid coil 308 based on the potential on high voltage bus 404. In certain embodiments, a current sense resistor may be used to determine the discharge time of solenoid coil 308 based on a measured current conducted through solenoid coil 308. The determined discharge time or measured current may then be further utilized in determining a desired frequency and duty cycle of the PWM signal.

Flyback circuit 406 includes a feed diode 420, an over-voltage protection diode 422, and a capacitor 424. When switch 412 periodically de-energizes solenoid coil 308 according to the PWM signal, energy stored in solenoid coil 308 builds an opposite-polarity voltage across solenoid coil 308 that is steered by feed diode 420 to build a charge across capacitor 424. The resulting voltage across capacitor 424 represents high voltage bus 404.

The frequency and duty cycle of the PWM signal generated by switch 412 is regulated for four distinct durations: (1) holding poppet 312 in a closed position, (2) translating poppet 312 from the closed position to the opened position, (3) holding poppet 312 in the opened position, and (4) translating poppet 312 from the opened position to the closed position.

When holding poppet 312 in the closed position, a low voltage, supplied by low voltage bus 402, is applied to solenoid coil 308 and solenoid coil 308 is energized by a PWM signal, via switch 412, such that the current conducted through solenoid coil 308 is regulated to below the opening threshold, i.e., the threshold current for opening solenoid valve 300. Maintaining some current through solenoid coil 308 enables energy to be continuously stored in solenoid coil 308, i.e., solenoid coil 308 is charged. During the PWM period, when solenoid coil 308 is de-energizing, energy stored in solenoid coil 308 is discharged and recovered by flyback circuit 406 that charges high voltage bus 404, i.e., solenoid coil 308 and flyback circuit 406 form a switched boost converter. Switch 412 is configured to regulate duty cycle and frequency of the PWM signal to hold the coil current below the opening threshold and to charge high voltage bus 404.

When solenoid valve 300 is to be opened, i.e., poppet 312 translates from the closed position to the opened position, a high voltage, sourced from high voltage bus 404, is applied, via switch 408, to solenoid coil 308 and solenoid coil 308 is energized using a 100% duty cycle DC signal, via switch 412, to drive the coil current above the opening threshold as quickly as possible. Moreover, the coil current leading up to the opening is preferably maintained just below the opening threshold, thereby minimizing the time required to increase the coil current above the opening threshold. Accordingly, the delay in opening solenoid valve 300 is reduced.

In an alternative embodiment, when solenoid valve 300 is to be opened, the low voltage, sourced from low voltage bus 402, is initially applied to solenoid coil 308 for a duration of, for example, 8 ms, after which the high voltage, sourced by high voltage bus 404, is applied to solenoid coil 308. The additional voltage applied to solenoid coil 308 pushes the coil current above the opening threshold and can increase the MOPD of the solenoid valve and reduce the turn-on time.

When solenoid valve 300 is opened, there is a duration when poppet 312 is maintained in the opened position. Generally, the power necessary to hold poppet 312 in an opened position is much less than the power necessary to translate poppet 312 to the opened position. It is realized herein that once poppet 312 is in the opened position, the high voltage may be replaced by the low voltage that is applied by a PWM signal, via switch 412, to reduce the power consumption of solenoid valve 300. The coil current is regulated to just above a closing threshold, i.e., a current threshold below which the force generated by solenoid coil 308 is insufficient to hold poppet 312 in the opened position. When solenoid coil 308 is de-energized during the PWM period, energy stored in solenoid coil 308 is recovered by flyback circuit 406 that charges high voltage bus 404.

When solenoid valve 300 is to be closed, switch 412 opens and solenoid coil 308 is de-energized to reduce the coil current to below the closing threshold as quickly as possible. In at least some embodiments, the closing threshold is nearly zero amperes. In alternative embodiments, the closing threshold may be greater than zero amperes. In such embodiments, the current conducted through solenoid coil 308 is reduced to below the closing threshold, e.g., zero, for at least a sufficient duration to close solenoid valve 300. In certain embodiments, once solenoid valve 300 is closed, solenoid coil 308 continues to conduct a current to maintain the energy stored in solenoid coil 308 and to remain ready for the next opening cycle. Accordingly, in such embodiments, the current conducted through solenoid coil 308 is regulated to just below the opening threshold.

Figure 5:
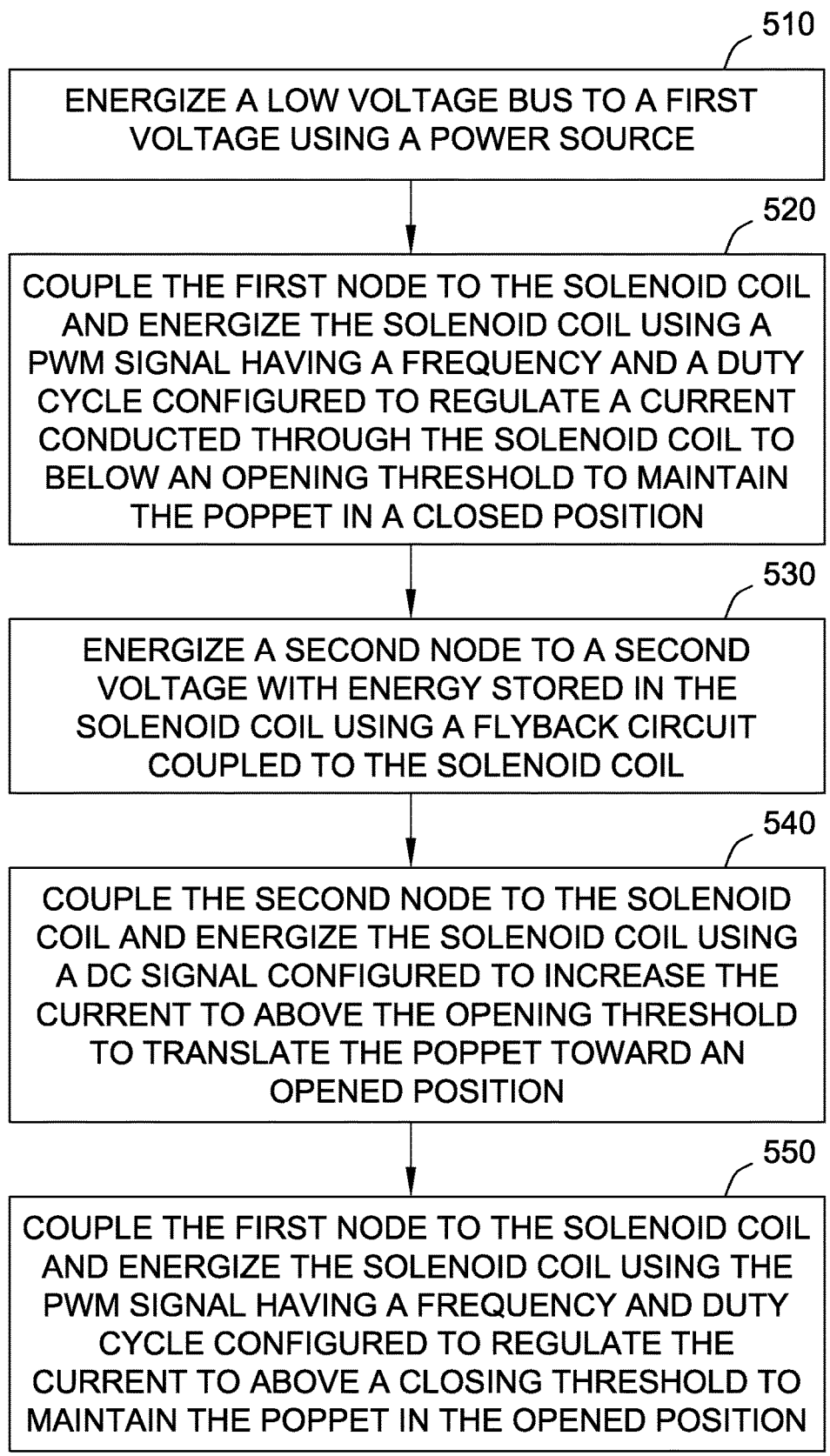
FIG. 5 is a flow diagram of an exemplary method of controlling the solenoid valve shown in FIG. 3.

FIG. 5 is a flow diagram of a method 500 of controlling solenoid valve 300 (shown in FIG. 3) using, for example, drive circuit 400 (shown in FIG. 4). Method 500 includes energizing 510 low voltage bus 402 using a power source. Method 500 includes coupling 520 low voltage bus 402 to solenoid coil 308 and energizing solenoid coil 308 using a PWM signal having a frequency and duty cycle configured to regulate a current conducted through solenoid coil 308 to below an opening threshold to maintain poppet 312 in a closed position.

Method 500 includes energizing 530 high voltage bus 404 with energy stored in solenoid coil 308 using flyback circuit 406 coupled to solenoid coil 308.

Method 500 includes coupling 540 high voltage bus 404 to solenoid coil 308 and energizing solenoid coil 308 using a DC signal configured to regulate the current to above the opening threshold to translate poppet 312 toward an opened position.

Method 500 includes coupling 550 low voltage bus 402 to solenoid coil 308 and energizing solenoid coil 308 using the PWM signal having a duty cycle and frequency configured to regulate the current to above a closing threshold to maintain poppet 312 in the opened position.

Figure 6:
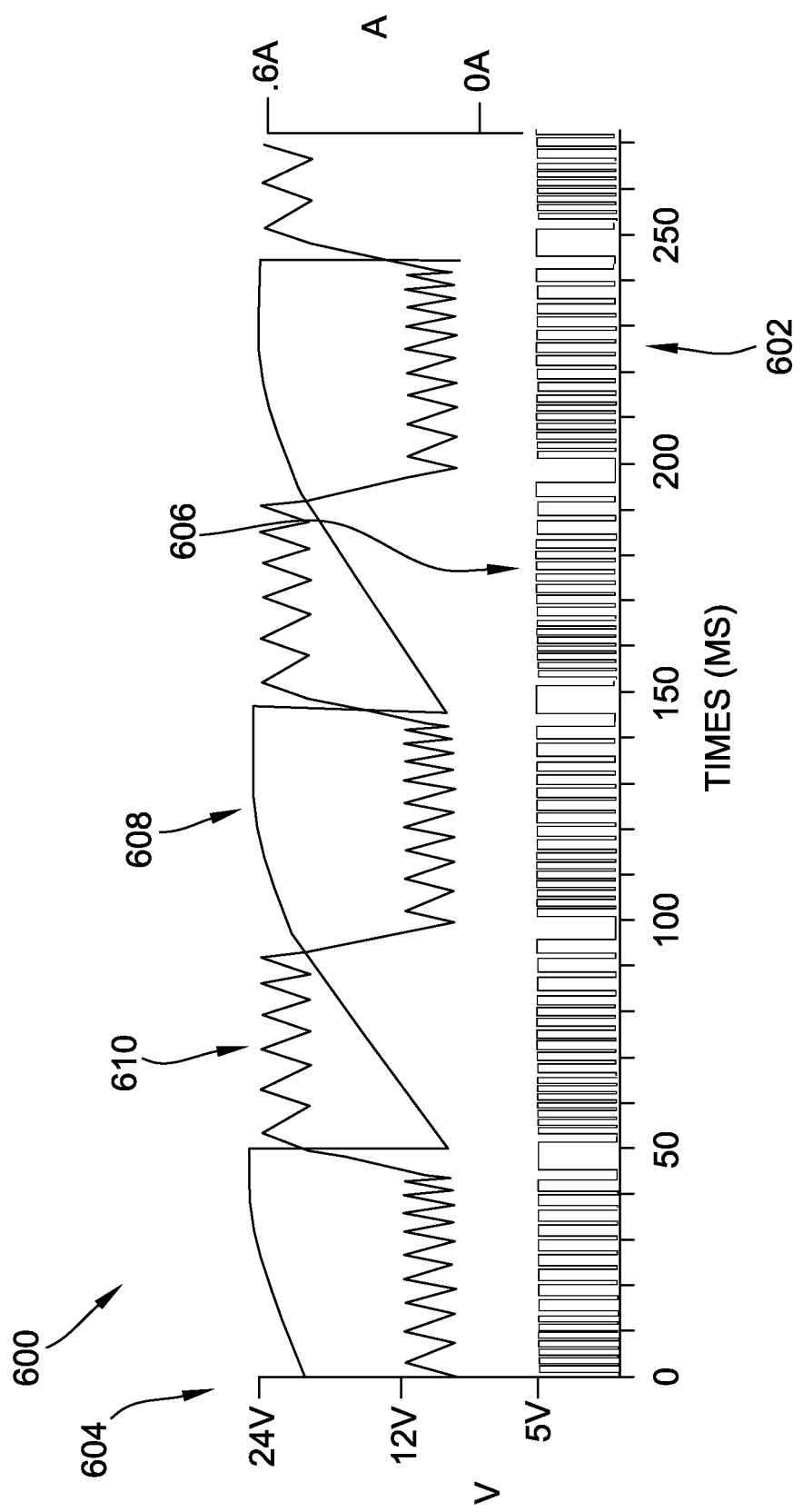
FIG. 6 is a plot of exemplary signals present in the drive circuit shown in FIG. 4.

FIG. 6 is a plot 600 of exemplary signals present in drive circuit 400, shown in FIG. 4. Plot 600 illustrates signals over a horizontal time axis 602 expressed in ms and ranging from zero to about 250 ms. Plot 600 illustrates signals on a vertical axis 604 that represents voltage expressed in Volts DC and ranging from zero to about 24 Volt DC, or expressed in Amperes ranging from zero to about 0.6 Amperes. Plot 600 includes a PWM signal 606 for controlling switch 412, such as, for example, switching signal 414 (shown in FIG. 4). Notably, PWM signal 606 has a varying frequency and duty cycle. Plot 600 includes a bus voltage signal 608 representing the high voltage present on high voltage bus 404 (shown in FIG. 4). Notably, bus voltage signal 608 increases over time as it is charged by flyback circuit 406 and is discharged rapidly when solenoid valve 300 is opened. Plot 600 includes a coil current signal 610 representing the buildup of current conducted through solenoid coil 308 over time. Notably, coil current signal 610 is generally non-zero and is highest when opening solenoid valve 300. Further, in certain embodiments, coil current signal 610 may be approximately zero (or otherwise below the closing threshold) for a duration when solenoid valve 300 is closing.

Figure 7:
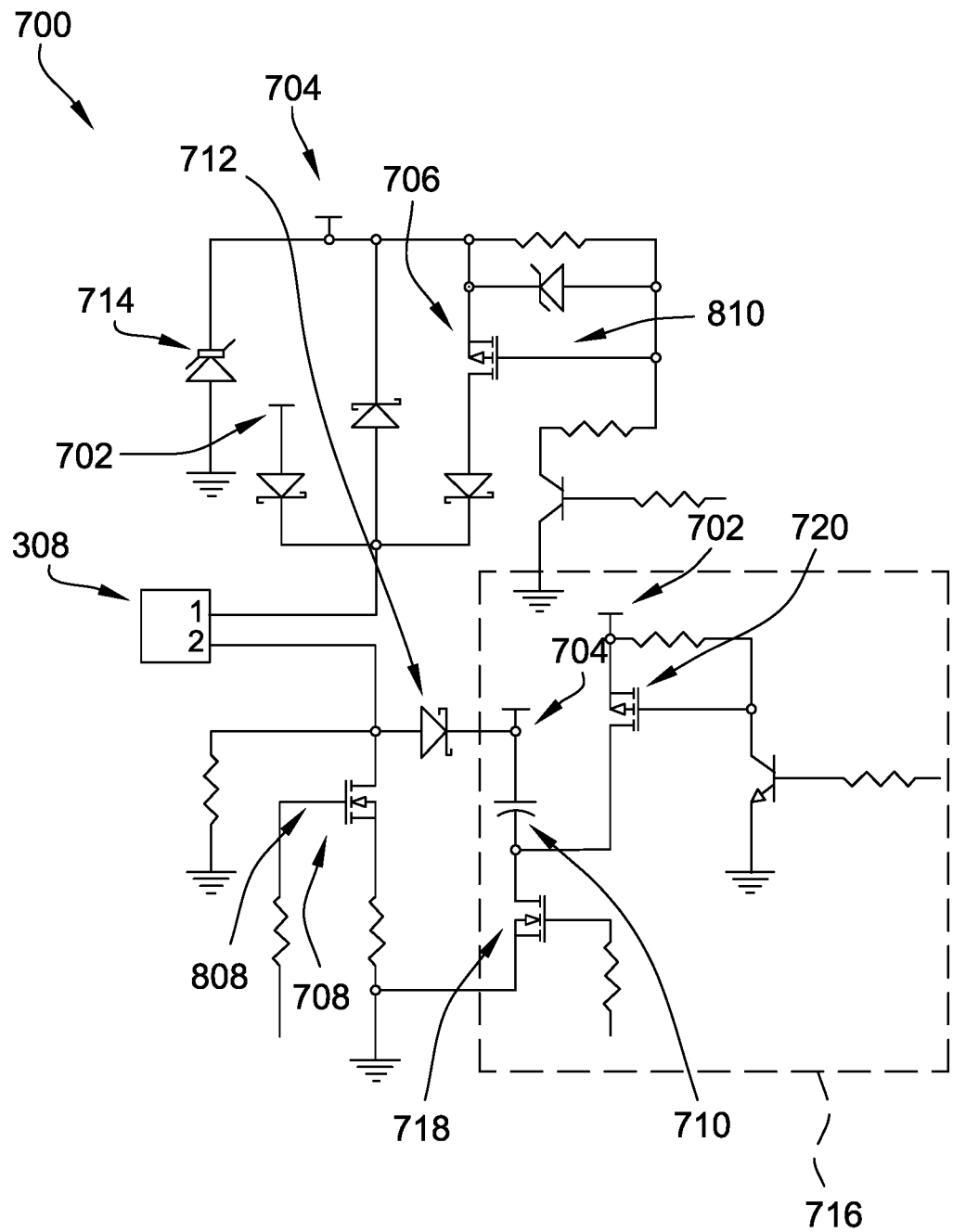
FIG. 7 is a schematic diagram of an exemplary drive circuit for use with the solenoid valve shown in FIG. 3.
Figure 8:
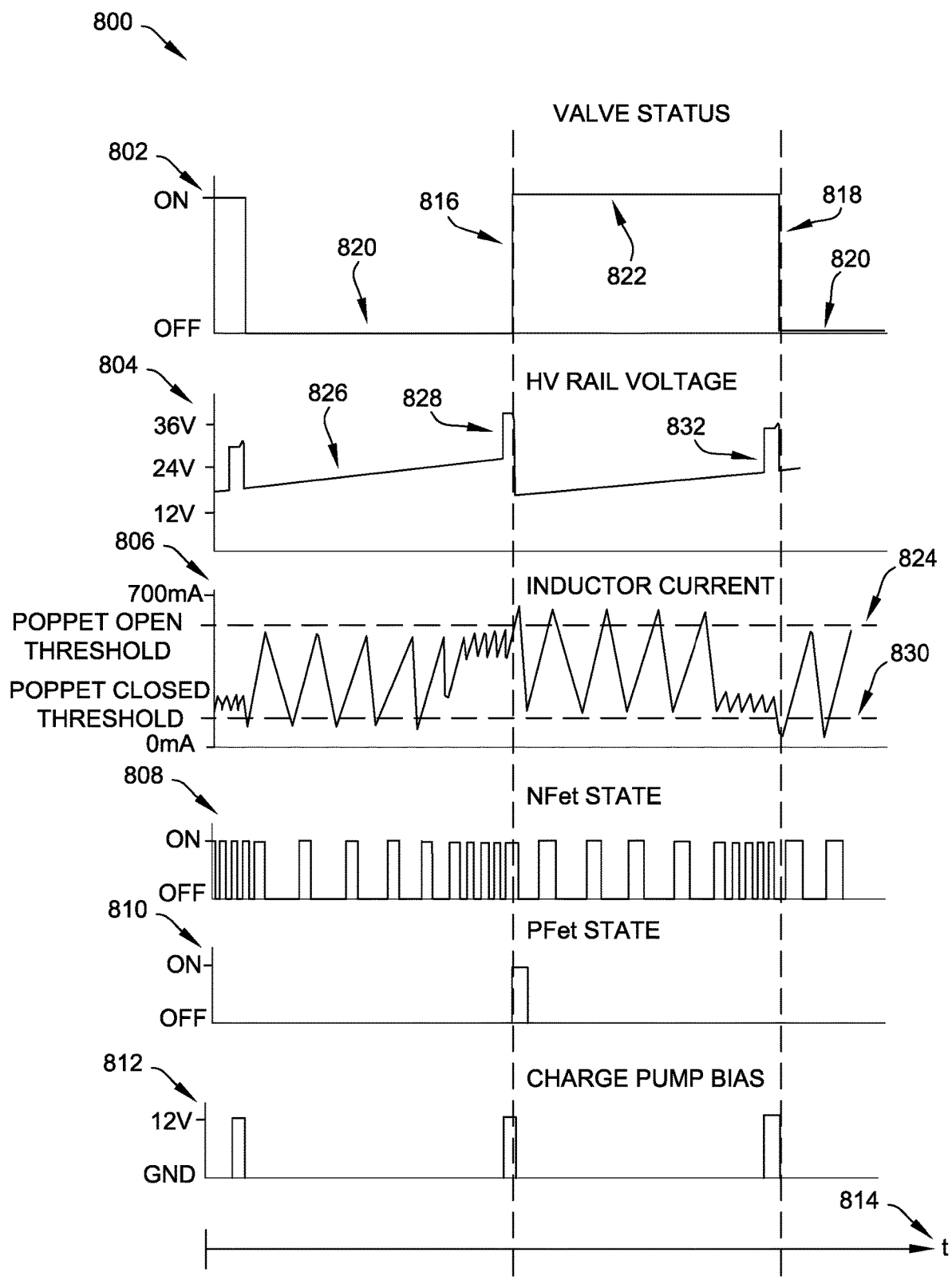
FIG. 8 is a plot of exemplary signals present in the drive circuit shown in FIG. 7.

FIG. 7 is a schematic diagram of an exemplary drive circuit 700 for use with solenoid valve 300 and solenoid coil 308 shown in FIG. 3. FIG. 8 is a plot 800 of exemplary signals over time, t, present in drive circuit 700 shown in FIG. 7. FIG. 8 includes plots of signals 802, 804, 806, 808, 810, and 812 with respect to time, t, represented by a horizontal time axis 814.

Drive circuit 700 includes a low voltage bus 702 and a high voltage bus 704. A potential 804 of high voltage bus 704 is illustrated in FIG. 8. Potential 804 is illustrated with respect to a vertical axis for voltage ranging from zero Volts DC to 36 Volts DC.

Power supplied to solenoid coil 308 is regulated by a switch 706 and a switch 708. Switch 706 is illustrated as a PFET device that selectively couples high voltage bus 704 to solenoid coil 308. Switch 706 is controlled by a PFET control signal 810, illustrated in FIG. 8. PFET control signal 810 is illustrated as a discrete signal, i.e., having an on state and an off state. Switch 708 is illustrated as an NFET device that selectively couples solenoid coil 308 to ground, thereby enabling solenoid coil 308 to conduct a coil current 806, illustrated in FIG. 8. Coil current 806 is illustrated with respect to a vertical axis for Amperage ranging from zero milliamp (mA) to 700 mA. Coil current 806 is illustrated as generally non-zero; however, coil current 806, for certain embodiments of solenoid valve 300, may be zero or nearly zero amperes in durations where solenoid valve 300 is closing, i.e., the closing threshold current is at or nearly zero amperes. Switch 708 is controlled by an NFET control signal 808, illustrated in FIG. 8. NFET control signal 808 is illustrated as a discrete signal, i.e., having an on state and an off state.

Drive circuit 700 includes a flyback circuit that includes a capacitor 710, a feed diode 712, and an over-voltage protection diode 714. As solenoid coil 308 is de-energized, an inverse potential develops across solenoid coil 308 and solenoid coil 308 discharges stored energy over time. Solenoid 308 discharges stored energy through feed diode 712 and charges capacitor 710. The potential generated across capacitor 710 represents potential 804 to which high voltage bus 704 is charged.

In certain embodiments, drive circuit 700 includes a charge pump circuit 716. Charge pump circuit 716 is configured to periodically and momentarily change the reference of capacitor 710 to boost potential 804 of high voltage bus 704 with respect to ground prior to opening or closing valve 300. Charge pump circuit 716 includes FET devices 718 and 720 configured to selectively reference capacitor 710 to ground, to low voltage bus 702, or, in certain embodiments, capacitor 710 is allowed to "float," i.e., as an open circuit. In alternative embodiments, one or both of FET devices 718 and 720 may be a BJT, an IGBT, or an electromechanical relay. When referenced to low voltage bus 702, i.e., capacitor 710 is coupled in series with low voltage bus 702, the potential 804 of high voltage bus 704 with respect to ground becomes a sum of the low voltage bus 702 potential and the potential across capacitor 710. FET devices 718 and 720 are controlled to produce alternating periods of charging and discharging. The periods of charging and discharging are illustrated in FIG. 8 by a charge pump bias signal 812, which alternates between bias to ground and low voltage bus 702, e.g., 12 VDC. Generally, charge pump bias signal 812 indicates capacitor 710 is referenced, or biased, to ground for a majority of a cycle duration. Capacitor 710 is referenced to low voltage bus 702 for a brief duration that corresponds to discharging capacitor 710 when opening the valve. Further, FET devices 718 and 720 are controlled by independent signals such that FET devices 718 and 720 are not both closed at any point in time (thereby preventing a short to ground). Further, both FET devices 718 and 720 are controlled to open when capacitor 710 is allowed to float, i.e., an open circuit.

In certain embodiments, where capacitor 710 is allowed to float, solenoid coil 308 is forced to discharge through over-voltage protection diode 714, which has a high reverse-bias voltage of, for example, 90-100 Volts. In such an embodiment, potential 804 on high voltage bus 704 is increased to the reverse-bias voltage for a brief duration, rather than a potential across capacitor 710.

During operation, drive circuit 700 operates valve 300 according to a valve control signal 802, illustrated in FIG. 8. Valve control signal 802 defines a PWM pattern of opening and closing valve 300. More specifically, valve 300 opens on a rising edge 816 and closes on a falling edge 818. Otherwise, valve 300 is maintained in either the closed 820 or opened position 822.

When valve 300 is in closed position 820, high voltage bus 704 is disconnected from solenoid coil 308, as illustrated by PFET control signal 810 leading up to rising edge 816 of valve control signal 802. Solenoid coil 308 is energized via low voltage bus 702 and a PWM signal represented by NFET control signal 808. The frequency and duty cycle of NFET control signal 808 are regulated to hold coil current 806 below an opening threshold 824 and to charge high voltage bus 704, as illustrated by the increase 826 in potential 804 leading up to rising edge 816. The frequency and duty cycle of NFET control signal 808 correspond to periods of charge and discharge of solenoid coil 308, as illustrated in coil current 806 and, more specifically, peak-to-peak variations in coil current 806 leading up to rising edge 816. Notably, the frequency of NFET control signal 808 increases leading up to rising edge 816. In certain embodiments, the frequency of NFET control signal 808 may decrease slowly and then increase sharply just before rising edge 816.

Charge pump circuit 716 is activated momentarily prior to rising edge 816, as illustrated by charge pump bias signal 812. More specifically, reference of capacitor 710 is switched from ground to low voltage bus 702 for a brief duration prior to rising edge 816 and corresponding to a momentary increase 828 in potential 804 on high voltage bus 704.

At rising edge 816, valve 300 is actuated, i.e., poppet 312 is translated from the closed position 820 to the opened position 822. The actuation corresponds to application of potential 804 on high voltage bus 704 to solenoid coil 308, as illustrated in PFET control signal 810. The increased potential 828 is applied with 100% duty cycle for a brief duration, illustrated by NFET control signal 808, to solenoid coil 308, enabling coil current 806 to exceed opening threshold 824 as quickly as possible.

When valve 300 is in the opened position 822, potential 804 on high voltage bus 704 is reduced and PFET control signal 810 controls switch 706 to disconnect high voltage bus 704 from solenoid coil 308. Charge pump circuit 716 re-references capacitor 710 to ground to enable charging. Solenoid coil 308 continues to be energized via low voltage bus 702 and NFET control signal 808 resumes PWM operation with a reduced frequency and a duty cycle configured to regenerate potential 804 on high voltage bus 704. Further, the frequency and duty cycle of NFET control signal 808 are regulated to maintain coil current 806 above closing threshold 830.

Leading up to falling edge 818, at which point valve 300 is closed, i.e., poppet 312 translates from opened position 822 to closed position 820, the frequency of NFET control signal 808 is increased to maintain coil current 806 just above closing threshold 830 such that, when falling edge 818 arrives and switch 708 is opened, coil current 806 falls below closing threshold 830 as quickly as possible. Again, charge pump circuit 716 switches the reference on capacitor 710 to low voltage bus 702 and corresponding to a momentary increase in potential 804 on high voltage bus 704. The momentary higher potential 832 on high voltage bus 704 further reduces the time necessary for solenoid coil 308 to discharge when de-energized.

Once valve 300 is back in closed position 820, NFET control signal 808 resumes PWM operation, capacitor 710 is re-referenced to ground, and solenoid coil 308 resumes cycles of charging and discharging to recharge high voltage bus 704.

Figure 9:
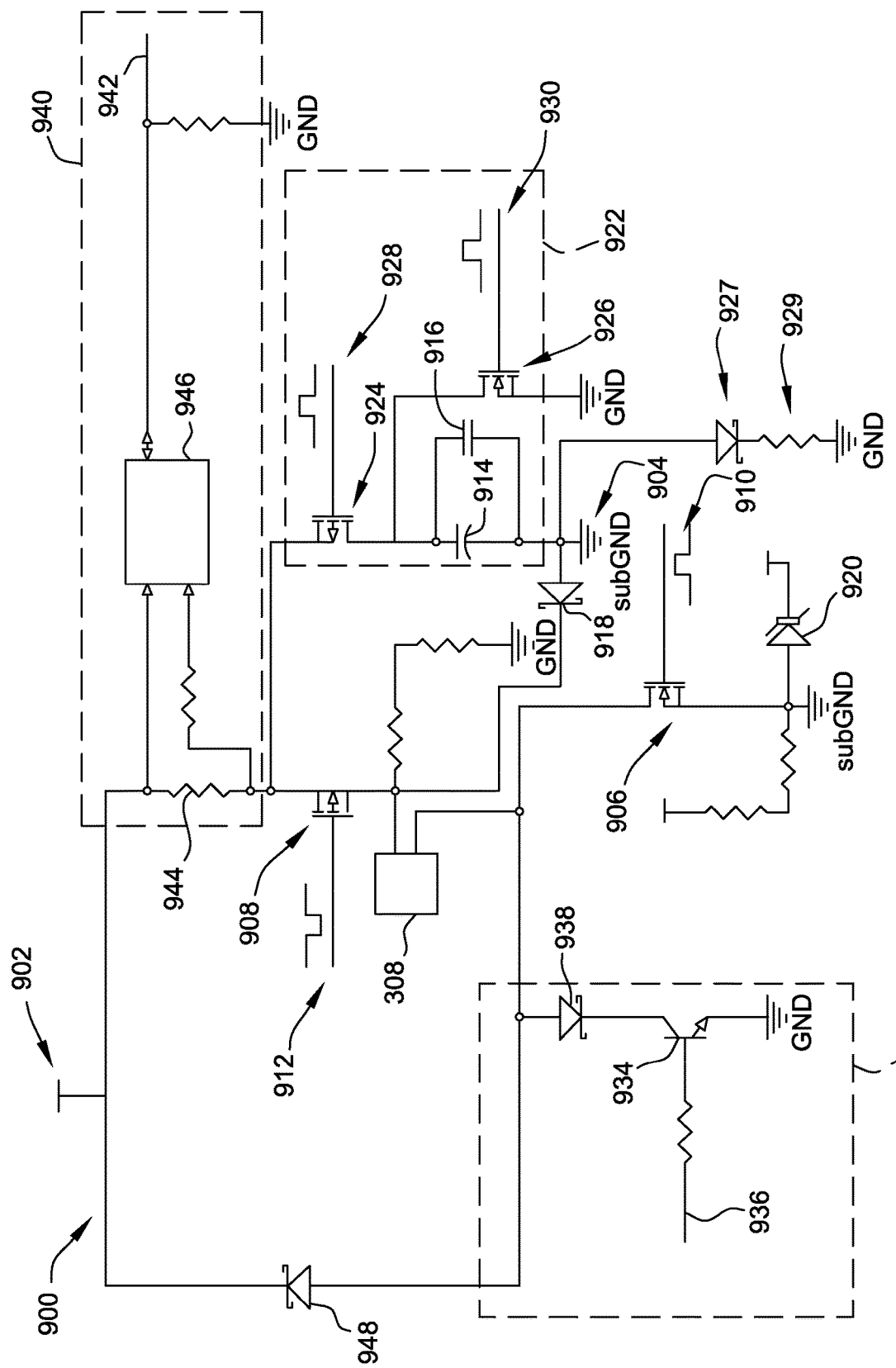
FIG. 9 is a schematic diagram of another exemplary drive circuit for use with the solenoid valve shown in FIG. 3.

FIG. 9 is a schematic diagram of an exemplary drive circuit 900 for use with solenoid valve 300 and solenoid coil 308 shown in FIG. 3. Method 500 shown in FIG. 5 may also be embodied in drive circuit 900.

Drive circuit 900 includes a 12V bus 902 (a first node) and a negatively charged node, or "sub-ground" 904 (a second node). A potential on sub-ground 904 may range from zero Volts DC to -24 Volts DC, or even from zero Volts DC to -50 Volts DC.

Power supplied to solenoid coil 308 is regulated by a switch 906 and a switch 908. In certain embodiments, power supplied to solenoid coil 308 is further regulated by a current throttling circuit 932. Switch 906 is illustrated as a NFET device that selectively couples sub-ground 904 to solenoid coil 308. Switch 906 is controlled by a NFET control signal 910. NFET control signal 910 is illustrated as a discrete signal, i.e., having an on state and an off state.

Switch 908 is illustrated as a PFET device that selectively couples solenoid coil 308 to 12V bus 902, thereby enabling solenoid coil 308 to conduct a coil current, similar to coil current 806 illustrated in FIG. 8 and ranging from zero mA to 700 mA. Switch 908 is controlled by a PFET control signal 912. PFET control signal 912 is illustrated as a discrete signal, i.e., having an on state and an off state.

Drive circuit 900 includes a flyback circuit that includes capacitors 914 and 916, a feed diode 918, and an over-voltage protection diode 920. When solenoid coil 308 is de-energized, an inverse potential develops across solenoid coil 308 and solenoid coil 308 discharges stored energy over time. Solenoid 308 discharges stored energy through feed diode 918 and charges capacitor 914 and 916. The potential generated across capacitors 914 and 916 represents the potential to which sub-ground 904 is negatively charged.

In certain embodiments, drive circuit 900 includes a charge pump circuit 922. Charge pump circuit 922 is configured to periodically and momentarily change the reference of capacitor 914 to boost a negative potential of sub-ground 904 with respect to ground prior to opening or closing valve 300. Charge pump circuit 922 includes FET devices 924 and 926 configured to selectively reference capacitor 914 to ground, to 12V bus 902, sub-ground 904, or, in certain embodiments, capacitor 914 is allowed to "float," i.e., as an open circuit. Additionally, FET devices 924 and 926 are controlled such that they are not both closed at the same time (to prevent a short from 12V bus 902 to ground).

Charge pump circuit 922 is controlled by a charge control signal 928 and a discharge control signal 930. More specifically, charge control signal 928 commutates FET 924 to couple, or reference, capacitors 914 and 916 between 12V bus 902 and ground. When referenced to 12V bus 902, capacitor 914 is charged (at its negative pole) through a diode 927 and a resistor 929. Feed diode 918 further charges capacitor 914 negatively during operation as described above.

Discharge control signal 930 commutates FET 926 to couple, or reference, capacitors 914 and 916 between ground and sub-ground 904. More specifically, FET 926 is closed to couple the positive pole of capacitor 914 to ground, thereby making the potential across capacitors 914 and 916 the potential of sub-ground 904. When referenced to ground and when switch 906 is closed, the potential at sub-ground 904, or across capacitors 914 and 916, and the potential on 12V bus 902 momentarily add to increase the potential applied across solenoid coil 308.

Charge control signal 928 and discharge control signal 930 are illustrated as discrete signals alternating logical high and low voltages. In certain embodiments, where capacitors 914 and 916 are allowed to float, solenoid coil 308 is forced to discharge through over-voltage protection diode 920, which has a high reverse-bias voltage of, for example, 90-100 Volts. In such an embodiment, the potential across 12V bus 902 and sub-ground 904 is increased to the reverse-bias voltage for a brief duration, rather than a potential across capacitors 914 and 916.

During operation, drive circuit 900 operates valve 300 according to valve control signal 912. Valve control signal 912 defines a PWM pattern of opening and closing valve 300. More specifically, valve 300 opens on a rising edge and closes on a falling edge. Otherwise, valve 300 is maintained in either the closed or opened position.

Drive circuit 900 includes a current throttling circuit 932 that enables a calibrated amount of current to be conducted by solenoid coil 308 and maintain the coil current just below an opening threshold when valve 300 is in the closed position. Conversely, current throttling circuit 932 enables a calibrated amount of current to be conducted by solenoid coil 308 when valve 300 is in the opened position, where the coil current is maintained just above a closing threshold for valve 300.

Current throttling circuit 932 includes a bipolar junction transistor (BJT) 934 coupled between solenoid coil 308 and ground, and in series with 12V bus 902 and solenoid coil 308. The current conducted through solenoid coil 308 is controlled by the gain of BJT 934. BJT 934 is controlled by a throttling control signal 936. In certain embodiments, throttling control signal 936 is an analog control signal generated by, for example, an analog output from a microprocessor or a digital-to-analog converter (DAC) integrated therein or provided separately. Further, in certain embodiments, the analog signal is buffered, for example, by an op-amp before being provided to BJT 934, thereby enabling an appropriate amount of current to be delivered to BJT 934 to achieve the desired current through solenoid coil 308. Further, in certain embodiments, the analog signal may be pulsed off and on in a PWM fashion. Current throttling circuit 932 includes a Schottky rectifier diode 938 that prevents current from conducting from sub-ground 904 through BJT 934 to ground when opening solenoid valve 300. It should be understood that current throttling circuit 932 may be used independently of certain aspects of drive circuit 900 and, in some embodiments, may be used as a drive circuit by itself.

In certain embodiments, current throttling circuit 932 is configured to modulate current conducted through solenoid coil 308 based on a real-time current measurement. Drive circuit 900 includes a current measurement circuit 940 that, in certain embodiments, provides a current measurement signal 942 to a microprocessor for controlling throttling control signal 936 and, consequently, to adjust the current conducted through solenoid coil 308. Current measurement circuit 940 includes a current sense resistor 944 coupled in series with solenoid coil 308. In certain embodiments, as illustrated in FIG. 9, current sense resistor 944 is further coupled in series with charge pump circuit 922. In alternative embodiments, a separate current measurement circuit may be provided for measuring current supplied to charge pump circuit 922. In further alternative embodiments, current measurement for charge pump circuit 922 may be omitted entirely. Current measurement circuit 940 includes a current sense amplifier 946 coupled across current sense resistor 944 and configured to detect the voltage drop across current sense resistor 944 and output the current measurement signal 942. Current measurement signal 942, depending on when the measurement is collected, represents the current conducted through solenoid coil 308 or the current supplied to charge pump circuit 922.

Drive circuit 900 includes a flyback diode 948 coupled in parallel with solenoid coil 308. Flyback diode 948 slows the dissipation of coil current from solenoid coil 308 when switch 906 or BJT 934 are switched at a high frequency. By slowing the dissipation, or decay, flyback diode 948 enables the coil current to remain substantially constant, and above a threshold at which valve 300 would close, when switching switch 906 or BJT 934 at a high frequency and suitable duty cycle, e.g., when the valve is being held in the opened position by a high frequency PWM NFET control signal 910 or a high frequency PWM signal applied to BJT 936. Flyback diode 948 is a low forward voltage diode, such as a Schottky diode or a germanium diode. Low-forward voltage diodes generally have a forward voltage in a range of about 150 millivolt to 450 millivolt. In alternative embodiments, flyback diode 948 is a typical silicon diode or other diode having a forward voltage of about 0.7 millivolt or higher, although such an embodiment may not perform as well. Generally, the rate at which solenoid coil 308 discharges its stored energy is directly related to a voltage drop across solenoid coil 308, which is further a function of the back EMF generated to force current to conduct through flyback diode 948, feed diode 918, or protection 920. Accordingly, the lower the forward voltage of flyback diode 948, the lower the voltage drop across solenoid coil 308, and the slower energy is dissipated from solenoid coil 308. In other words, a lower forward voltage enables a slower dissipation of the coil energy and, consequently, a more-steady coil current as switch 906 or BJT 934 are switched at a high frequency.

Charge pump circuit 922 is activated, via discharge control signal 930, a duration of time prior to closing switch 908. More specifically, capacitors 914 and 916 are coupled between 12V bus 902 and sub-ground 904 for a brief duration prior to a rising edge of PFET control signal 912 and corresponding to a momentary increase in negative potential on sub-ground 904.

At the rising edge of PFET control signal 912, valve 300 is actuated, i.e., poppet 312 is translated from the closed position to the opened position. The actuation corresponds to application of the potential across 12V bus 902 and sub-ground 904 to solenoid coil 308. The increased potential is applied with 100% duty cycle for a brief duration by NFET control signal 910, to solenoid coil 308, enabling the coil current to exceed the opening threshold of valve 300 as quickly as possible.

Once valve 300 is transitioned to the opened position, FET 926 is opened to stop discharge of capacitors 914 and 916. In certain embodiments, capacitors 914 and 916 are re-connected to 12V bus 902 a short time later to begin recharging. In alternative embodiments, charge control signal 928 closes FET 924 after valve 300 is de-energized by opening switch 908. In further alternative embodiments, charge control signal 928 is a PWM signal having a frequency and duty cycle to charge capacitors 914 and 916 during "off" periods of switch 908.

Once valve 300 is transitioned to the opened position, switch 906 is opened to remove application of the potential on sub-ground 904. Current throttling circuit 932 remains active, i.e., BJT 934 is closed, to enable enough coil current to conduct through solenoid coil 308 to maintain poppet 312 in the opened position. The coil current is maintained just above the threshold at which valve 300 closes (i.e., the closing threshold), such that, when the rising edge of PFET control signal 912 arrives, coil current falls below the threshold as quickly as possible and valve 300 closes.

In an alternative embodiment, similar to drive circuit 700 (shown in FIG. 7), where current throttling circuit 932 is omitted, BJT 934 is replaced by an NFET device that is controlled by an NFET control signal at a variable frequency and duty cycle to maintain the coil current just below an opening threshold when valve 300 is in the closed position. Conversely, the NFET device is controlled (e.g., with a PWM signal or an amplifier FET) to enable a calibrated amount of current to be conducted by solenoid coil 308 when valve 300 is in the opened position, where the coil current is maintained just above a closing threshold for valve 300. In such an embodiment, when valve 300 is in a closed position, capacitors 914 and 916 are decoupled from ground by opening FET 926. Solenoid coil 308 is energized by 12V bus 902 according to PFET control signal 912, which is generated as a PWM signal by a microprocessor or other suitable processing device to have a desired frequency and duty cycle. The frequency and duty cycle of PFET control signal 912 are regulated to hold the coil current below an opening threshold for valve 300. In embodiments having charge pump circuit 922, FET 924 is commutated to close and enable charging of capacitors 914 and 916 using current that is "free-wheeled" by feed diode 918 as switch 908 is switched at a high frequency. The frequency and duty cycle of PFET control signal 912 correspond to periods of charge and discharge of solenoid coil 308. The frequency of PFET control signal 912 increases leading up to the opening or closing of solenoid valve 300. In certain embodiments, the frequency of PFET control signal 912 may decrease slowly and then increase sharply just before the opening of solenoid valve 300.

When valve 300 is to be opened, NFET control signal 910 is generated as a 100% duty cycle signal to enable coil current to increase above the opening threshold as quickly as possible. Additionally, as described above, discharge control signal 930 couples capacitors 914 and 916 to ground, and charge control signal 928 opens FET 924, thereby enabling discharge of charge pump circuit 922. Discharge of capacitors 914 and 916 develops a negative potential on sub-ground 904, which adds to the potential of 12V bus 902 and is applied across solenoid coil 308.

Once valve 300 is opened, i.e., poppet 312 translates to the opened position, discharge of charge pump circuit 922 is disabled, solenoid coil 308 continues to be energized via 12V bus 902, BJT 934 remains closed, and PFET control signal 912 resumes PWM operation with a reduced frequency and a duty cycle configured to regenerate the potential across capacitors 914 and 916. Further, the frequency and duty cycle of PFET control signal 912 are regulated to maintain the coil current above a closing threshold.

Prior the valve 300 closing, the frequency of PFET control signal 912 is increased to maintain the coil current just above the closing threshold such that, when the duty cycle of PFET control signal 912 is reduced to zero, the coil current falls below the closing threshold as quickly as possible.

Once valve 300 is back in a closed position, PFET control signal 912 resumes PWM operation, capacitors 914 and 916 are re-referenced between 12V bus 902 and sub-ground 904, and solenoid coil 308 resumes cycles of charging and discharging to recharge capacitors 914 and 916.

Figure 10:
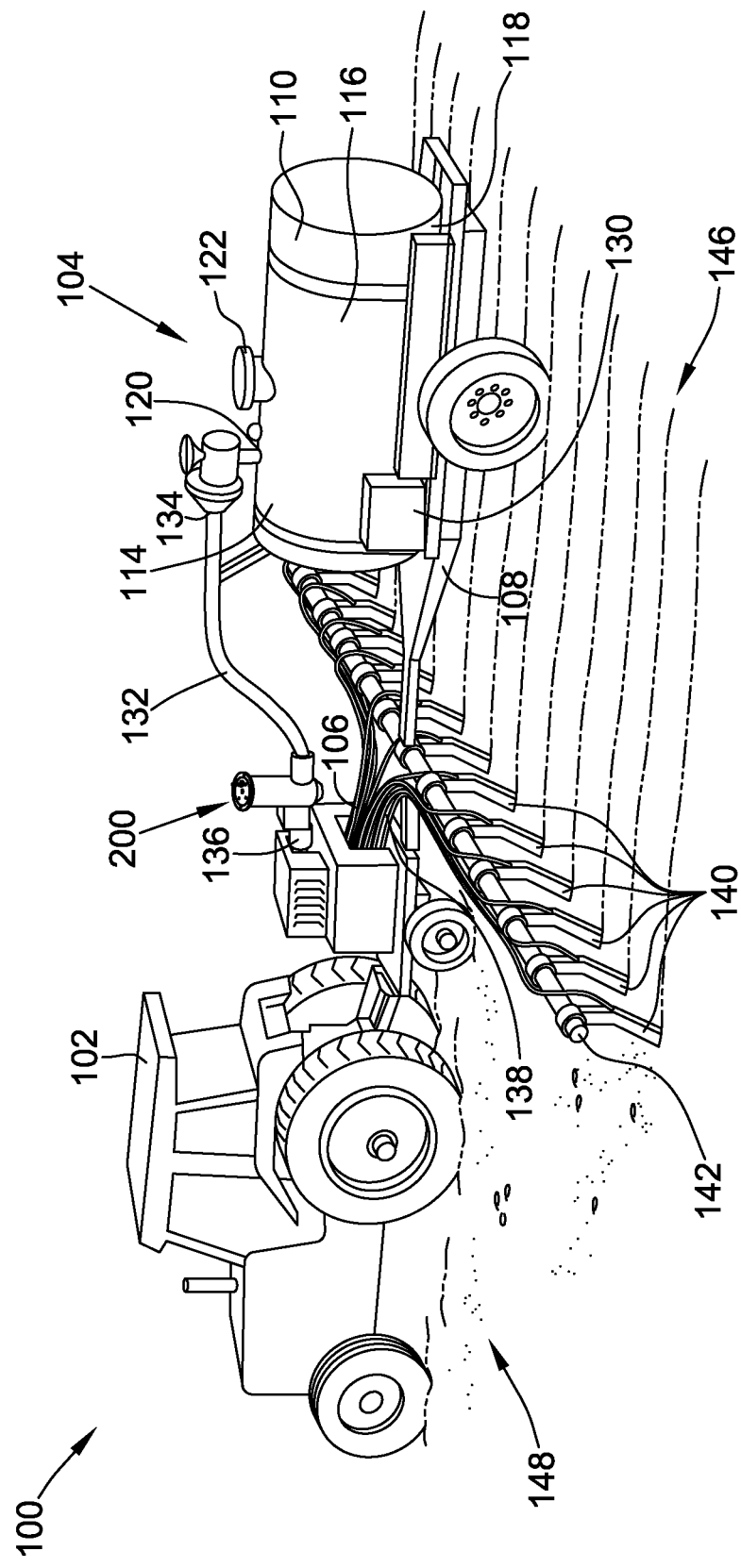
FIG. 10 is a perspective view of a fluid application system.

FIG. 10 is a perspective view of one embodiment of a fluid application system 100. Fluid application system 100 includes a volatile liquid fertilizer application system for application of fertilizers such as, for example, anhydrous ammonia. Fluid application system 100 includes a motorized vehicle 102, a fluid storage tank 104, and a distribution manifold 106. Motorized vehicle 102 may be any machine that enables fluid application system 100 to function as described herein. In suitable embodiments, one or more components of fluid application system 100 may be incorporated into motorized vehicle 102 without departing from some aspects of this disclosure. In the exemplary embodiment, fluid storage tank 104 and distribution manifold 106 are disposed on a wheeled chassis 108 towed behind motorized vehicle 102.

During operation, fluid storage tank 104 may contain any type of fluid for distribution by fluid application system 100. For example, fluid storage tank 104 may store a volatile fluid intended to be applied to fields for agricultural purposes. A common fluid used for agricultural purposes is anhydrous ammonia, which is applied to fields primarily as a fertilizer to increase the nutrient level of soils. The anhydrous ammonia includes at least some gaseous substance and, therefore, is maintained at a carefully controlled pressure to control the gaseous properties. In the exemplary embodiment, fluid storage tank 104 is configured to store and maintain the fluid at a desired pressure as fluid flows out of the fluid storage tank. Fluid application system 100 includes at least one pump 130 connected to fluid storage tank 104 to facilitate maintaining the fluid in the fluid storage tank at the desired pressure.

In the exemplary embodiment, fluid storage tank 104 is fluidly connected to a distribution manifold 106 by a fluid line 132. Disposed between distribution manifold 106 and fluid storage tank 104 is a valve 136 and quick connect 134. In suitable embodiments, quick connect 134 and valve 136 may be coupled to any portions of fluid application system 100. For example, in some suitable embodiments, any of quick connect 134 and valve 136 may be omitted without departing from some aspects of this disclosure. In the exemplary embodiment, quick connect 134 facilitates fluid storage tank 104 being connected to and removed from fluid line 132. Valve 136 controls fluid flow through fluid line 132. For example, valve 136 is positionable between a closed position where fluid is inhibited from flowing through fluid line 132 and an open position where fluid is allowed to flow through fluid line 132. In certain embodiments, valve 136 may be any valve that enables fluid application system 100 to function as described herein.

The fluid is directed from fluid line 132 through valve 136 and into distribution manifold 106. As shown in FIGS. 9 and 10, distribution manifold 106 includes a plurality of supply lines 138 each connected to valve assemblies 36. Each valve assembly 36 regulates flow of the fluid into a dispensing tube 140 for injecting the fluid into a soil. Distribution manifold 106 distributes the fluid to valve assemblies 36 and dispensing tubes 140 for emitting the fluid from fluid application system 100.

Each valve assembly 36 is controlled by a controller. The controller may be configured to control flow through dispensing tubes 140 using the methods described above with reference to FIGS. 3A-8.

Figure 11:
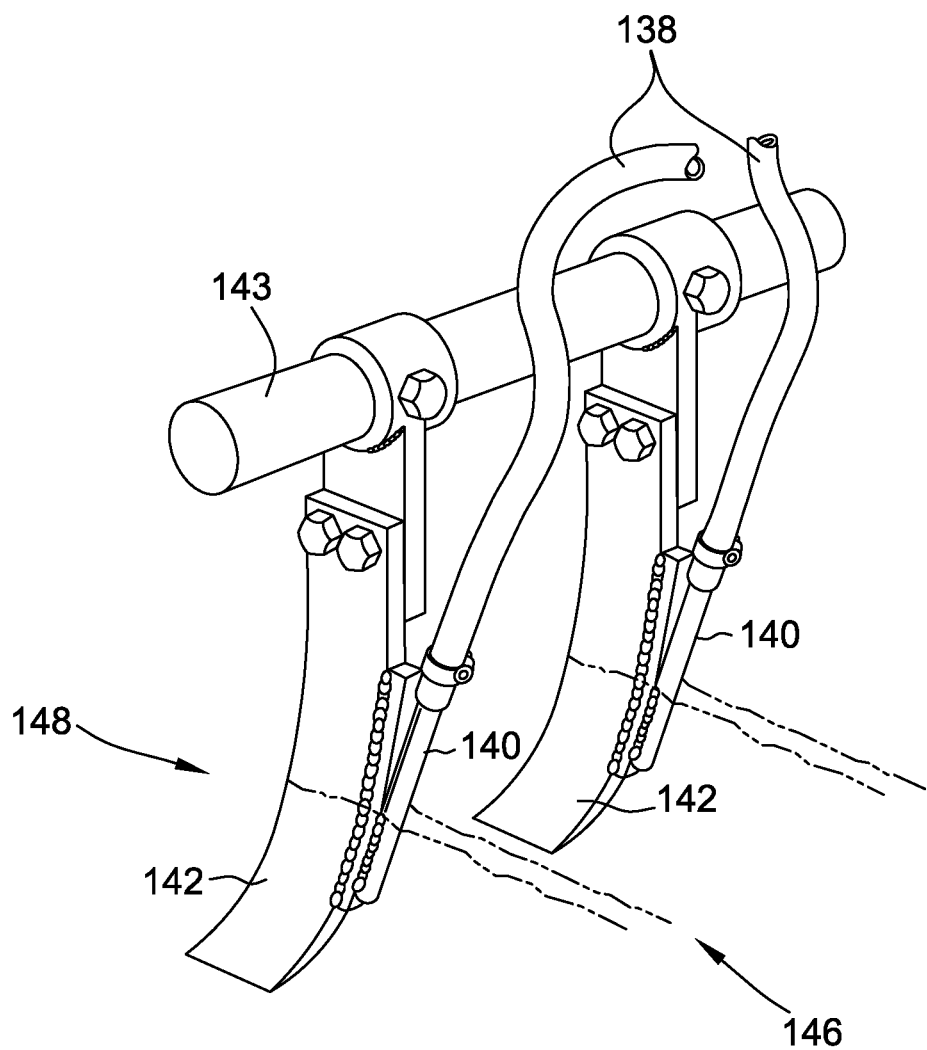
FIG. 11 is a perspective view of a portion of the fluid application system shown in FIG. 7.

In suitable embodiments, fluid application system 100 may include any number of dispensing tubes 140. In some embodiments, as the fluid is emitted from dispensing tubes 140, vehicle 102 moves fluid application system 100 along a desired path for fluid application, such as rows 146 of a field 148. In the exemplary embodiment, dispensing tubes 140 are connected to or positioned behind a soil preparation mechanism 142, such as a knife or plow that contacts the soil as dispensing tubes 140 dispense fluid onto the soil, as best seen in FIG. 11. Soil preparation mechanisms 142 are connected to a boom 143, which is connected to and pulled behind vehicle 102.

The technical effects of the systems, apparatus, and methods described herein include: (a) reducing turn-on time and turn-off time for solenoid valves; (b) providing a second node configured to be charged to a second voltage that is either a high voltage or a negative voltage using solenoid coils that are environmentally sealed, isolated from control electronics, have relatively large inductance, and have sufficient power capacity for boost converting without any additional cost, size, or weight; (c) reducing overall power consumption by regulating currents near opening and closing thresholds; (d) reducing power dissipation within the drive circuit by the use of electromagnetic field energy stored in the solenoid coil and by utilizing the flyback currents to charge a second node.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A method of controlling a solenoid valve having a solenoid coil and a poppet configured to translate therein, said method comprising:
   energizing a first node to a first voltage using a power source;
   coupling, by a control circuit coupled to the first node, the first node to the solenoid coil and energizing the solenoid coil using a pulse-width-modulated (PWM) signal having a first frequency and duty cycle configured to regulate a current conducted through the solenoid coil to below an opening threshold to maintain the poppet in a closed position;
   energizing a second node to a second voltage with energy stored in the solenoid coil using a flyback circuit coupled to the solenoid coil;
   coupling, by the control circuit further coupled to the second node, the second node to the solenoid coil and energizing the solenoid coil using a DC signal configured to increase the current to above the opening threshold to translate the poppet toward an opened position; and
   coupling the first node to the solenoid coil and energizing the solenoid coil using the PWM signal having a second frequency and duty cycle configured to regulate the current to above a closing threshold to maintain the poppet in the opened position.

2. The method of claim 1 further comprising computing the opening threshold based on a measured pressure differential across the solenoid valve.

3. The method of claim 1, wherein energizing the first node comprises coupling the first node to a 12 Volt direct current (DC) power supply.

4. The method of claim 1, wherein energizing the solenoid coil using the PWM signal to regulate a current conducted through the solenoid coil to below an opening threshold comprises modulating the PWM signal to at least 1000 Hertz.

5. The method of claim 4, wherein energizing the solenoid coil using the PWM signal comprises modulating the PWM signal to have a duty cycle in a range of 40 percent to 90 percent.

6. The method of claim 1 further comprising de-energizing the solenoid coil momentarily to reduce the current to below the closing threshold.

7. The method of claim 1 further comprising initiating opening of the solenoid valve according to a low frequency valve-pulsing PWM signal.

8. The method of claim 1 further comprising measuring the current conducted through the solenoid coil.

9. The method of claim 8 further comprising regulating the first frequency and duty cycle and the second frequency and duty cycle of the PWM signal according to measured current conducted through the solenoid coil.

10. The method of claim 8 further comprising regulating the duty cycle of the PWM signal according to measured current conducted through the solenoid coil.

11. The method of claim 1, wherein energizing the solenoid coil using the PWM signal to regulate a current conducted through the solenoid coil to above the closing threshold comprises modulating the PWM signal to no more than 40 Hertz.

12. The method of claim 11, wherein energizing the solenoid coil using the PWM signal comprises modulating the PWM signal to have a duty cycle in a range of 10 percent to 50 percent.

13. A drive circuit for controlling a solenoid valve having a solenoid coil and a poppet configured to translate therein, said drive circuit comprising:
- a first node configured to be energized to a first voltage using a power source;
- a flyback circuit coupled to the solenoid coil;
- a second node configured to be energized to a second voltage using energy stored in the solenoid coil using the flyback circuit;
- a control circuit coupled to said first node and said second node, said control circuit configured to:
  - couple the first node to the solenoid coil and energize the solenoid coil using a pulse-width-modulated (PWM) signal having a first frequency and duty cycle configured to regulate a current conducted through the solenoid coil to below an opening threshold to maintain the poppet in a closed position;
  - couple the second node to the solenoid coil and energize the solenoid coil using a DC signal configured to increase the current to above the opening threshold to translate the poppet toward an opened position; and
  - couple the first node to the solenoid coil and energize the solenoid coil using the PWM signal having a second frequency and duty cycle configured to regulate the current to above a closing threshold to maintain the poppet in the opened position.

14. The drive circuit of claim 13 further comprising a microcontroller coupled to said control circuit and configured to compute the opening threshold based on a measured pressure differential across the solenoid valve.

15. The drive circuit of claim 13 wherein the power source comprises a 12 Volt direct current (DC) power supply.

16. The drive circuit of claim 13, wherein said control circuit generates the PWM signal at the second frequency and duty cycle including a frequency of at least 1000 Hertz and a duty cycle in a range of 40 percent to 90 percent.

17. The drive circuit of claim 13, wherein said control circuit is further configured to de-energize the solenoid coil momentarily to reduce the current to below the closing threshold.

18. The drive circuit of claim 13 further comprising a microcontroller coupled to said control circuit, said microcontroller configured to receive a measurement of the current conducted through the solenoid coil.

19. The drive circuit of claim 18, wherein said microcontroller is further configured to operate said control circuit to regulate the first frequency and duty cycle and the second frequency and duty cycle of the PWM signal according to measured current conducted through the solenoid coil.

20. The drive circuit of claim 13, wherein said control circuit generates the PWM signal at the first frequency and duty cycle including a frequency of no more than 40 Hertz and a duty cycle in a range of 10 percent to 50 percent.

* * * * *